US012738384B2

(12) United States Patent
Nakamura et al.

(10) Patent No.: US 12,738,384 B2
(45) Date of Patent: Sep. 15, 2026

(54) DIRECT LASER FUSION SYSTEM

(71) Applicant: Blue Laser Fusion, Inc., Palo Alto, CA (US)

(72) Inventors: Shuji Nakamura, Palo Alto, CA (US); Hiroaki Ohta, Palo Alto, CA (US)

(73) Assignee: Blue Laser Fusion, Inc., Palo Alto, CA (US)

( * ) Notice: Subject to any disclaimer, the term of this patent is extended or adjusted under 35 U.S.C. 154(b) by 448 days.

(21) Appl. No.: 18/149,644

(22) Filed: Jan. 3, 2023

(65) Prior Publication Data

US 2024/0221963 A1 Jul. 4, 2024

(51) Int. Cl.

*G21B 1/03* (2006.01)
*G21B 1/13* (2006.01)
*G21B 1/15* (2006.01)
*G21B 1/19* (2006.01)
*G21B 1/23* (2006.01)

(52) U.S. Cl.

CPC ................ *G21B 1/03* (2013.01); *G21B 1/13* (2013.01); *G21B 1/15* (2013.01); *G21B 1/19* (2013.01); *G21B 1/23* (2013.01)

(58) Field of Classification Search

CPC ... G21B 1/03; G21B 1/15; G21B 1/19; G21B 1/23

See application file for complete search history.

(56) References Cited

U.S. PATENT DOCUMENTS 3,879,109 A 4/1975 Thomas
4,075,057 A 2/1978 Fletcher et al.
4,136,926 A * 1/1979 Sigler ................ G02B 19/0047 376/104
4,179,192 A * 12/1979 Shafer ...................... G21B 1/23 376/104
4,440,714 A * 4/1984 Rose ........................ G21B 1/03 976/DIG. 3
4,657,721 A * 4/1987 Thomas ................... G21B 1/23 376/104
5,168,400 A 12/1992 Moses
6,487,003 B1 11/2002 Suzuki et al.
6,807,216 B1 * 10/2004 Hilliard ............... H01S 3/08045 372/39
8,208,508 B2 6/2012 Deri et al.
9,171,646 B2 10/2015 Moses et al.

(Continued)

FOREIGN PATENT DOCUMENTS

CN 107086431 A 8/2017
KR 1020130137183 A 12/2013

(Continued)

OTHER PUBLICATIONS

International Search Report for related PCT Application No. PCT/US2023/086524 mailed May 24, 2024.

(Continued)

*Primary Examiner* — Sharon M Davis

(74) *Attorney, Agent, or Firm* — Richard T. Ogawa; Ogawa P.C.

(57) ABSTRACT

In an example, the present invention provides a laser fusion system comprising a reactor, a fusion material within an interior region of the reactor, and a high intensity pulse laser generation system configured by a hub and spoke spatial arrangement of laser cavity regions within the reactor.

16 Claims, 13 Drawing Sheets

(56) References Cited

U.S. PATENT DOCUMENTS

| | | | | |
|---|---|---|---|---|
| 10,410,752 | B2 | 9/2019 | Hora | |
| 10,476,226 | B2 | 11/2019 | Bayramian et al. | |
| 10,660,192 | B2 | 5/2020 | Campbell et al. | |
| 11,387,007 | B2 | 7/2022 | Moses et al. | |
| 2003/0002610 | A1 | 1/2003 | Panarella | |
| 2009/0000268 | A1 | 1/2009 | Yurash | |
| 2011/0235669 | A1 | 9/2011 | Deri et al. | |
| 2011/0261919 | A1 | 10/2011 | Sefcik et al. | |
| 2013/0064340 | A1 | 3/2013 | Latkowski et al. | |
| 2014/0138359 | A1 | 5/2014 | Carr et al. | |
| 2014/0348283 | A1 | 11/2014 | Perkins et al. | |
| 2015/0270019 | A1 | 9/2015 | Sekine et al. | |
| 2017/0022055 | A1* | 1/2017 | Kotzias | G21B 1/19 |
| 2018/0211732 | A1 | 7/2018 | Perkins | |
| 2021/0043334 | A1 | 2/2021 | Obenschain et al. | |

FOREIGN PATENT DOCUMENTS

| | | | | |
|---|---|---|---|---|
| WO | 2011029031 | A1 | 3/2011 | |
| WO | 2012064767 | A1 | 5/2012 | |
| WO | 2013070683 | A1 | 5/2013 | |
| WO | 2013133885 | A1 | 9/2013 | |
| WO | 2013165469 | A2 | 11/2013 | |
| WO | 2014113100 | A2 | 7/2014 | |
| WO | 2014130127 | A2 | 8/2014 | |
| WO | 2014160128 | A1 | 10/2014 | |
| WO | 2015021403 | A1 | 2/2015 | |
| WO | WO-2016128895 | A1 * | 8/2016 | G21B 1/23 |

OTHER PUBLICATIONS

Y. Hosaka et al., “Mode-locked pulse oscillation of a self-resonating enhancement optical cavity” Journal of Physics: Conference Series. 1350. 10.1088/1742-6596/1350/1/012028, Oct. 2016.

Peter Russbueldt et al., “Innoslab Amplifiers”, IEEE Journal of Selected Topics in Quantum Electronics, Jan./Feb. 2015, vol. 21, No. 1, pp. 447-463, Art No. 3100117, doi: 10.1109/JSTQE.2014.2333234.

Search Report from related GB application No. 2320129.6 mailed Jun. 28, 2024.

Edward I. Moses, The National Ignition Facility: Status and Plans for Laser Fusion and High-Energy-Density Experimental Studies, IEEE Explore, Feb. 2002, pp. 487-492, Fusion Engineering, 2002, 19th Symposium, 10.1109/FUSION.2002.1027741.

European Search Report for related application No. EP23220383.6 mailed Aug. 12, 2024.

Paschotta et al., Enhancement Cavities; optical resonator, doubly resonant, frequency doubling, efficiency, nonlinear frequency conversion, RP Photonics Encyclopedia, Jan. 1, 2005, pp. 1-5, DOI: 10.61835/13t, https://www.rp-photonics.com/enhanceme nt_cavities.html.

* cited by examiner

1x10$^{8}$W
1J
1 MHz

X100,000 →

1x10$^{13}$W (= 10TW)
100kJ pulse energy
10Hz
(When 200 laser beams are used for fusion reactor, 20MJ is achieved)

**Assuming simple math for cavity enhancement factor (loss to be considered in the actual case)*

DIRECT LASER FUSION SYSTEM

CROSS REFERENCE TO RELATED APPLICATIONS

This application is related to U.S. Provisional Patent Application 63/424,779, filed on Nov. 11, 2022, commonly assigned, and hereby incorporated in its entirety for all purposes.

BACKGROUND OF INVENTION

The present invention relates generally to fusion energy generation techniques. In particular, the present invention provides a system and method for fusion energy using a high intensity pulse laser generation system, and related methods. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

From the beginning of time, human beings have developed energy sources from natural materials such as wood, coal, oil, and gas products. Unfortunately, burning wood and coal leads to major pollution issues, including adding undesirable carbon particles into the atmosphere. Oil and gas products also have similar limitations and have been a leading cause of "Global Warming." Renewable energy sources including nuclear, wind, hydroelectric, and solar are promising. However, such renewable energy sources have other shortcomings. Wind only works if the wind is blowing. Solar cannot be used when the sun goes down. Hydroelectric is limited to areas with water, and nuclear, although promising, has had major problems in generating waste and unreliable and dangerous reactors. One other promising energy source has been fusion energy.

Fusion energy is a type of energy production that occurs when two atomic nuclei fuse together, releasing a large amount of energy in the process. It is considered a potential source of clean and abundant energy, as the fuel for fusion reactions (mainly hydrogen) is abundant on Earth and the reactions produce no greenhouse gases or other harmful pollutants.

There are two main approaches to achieving fusion reactions: inertial confinement fusion (ICF) and magnetic confinement fusion (MCF).

Inertial confinement fusion (ICF) involves using high-energy lasers or particle beams to compress and heat a small pellet of hydrogen fuel, causing it to fuse. The fuel is typically a mixture of deuterium and tritium, two isotopes of hydrogen. The fuel is contained within a small, spherical capsule called a hohlraum, which is placed at the center of a chamber filled with high-energy lasers or particle beams. When the lasers or particle beams are fired at the hohlraum, they create a uniform layer of x-rays that uniformly heat and compress the fuel inside the hohlraum. This causes the fuel to reach the necessary temperature and pressure conditions for fusion to occur The main advantage of ICF is that it can potentially produce fusion reactions with a relatively small amount of fuel and at a relatively low cost. However, the process is still in the experimental stage and there are significant technical challenges to before it can be considered a practical source of energy.

Magnetic confinement fusion (MCF) involves using strong magnetic fields to contain and heat a plasma (a hot, ionized gas) of hydrogen fuel, causing it to fuse. The most common type of MCF is called tokamak fusion, which uses a toroidal (doughnut-shaped) chamber to contain the plasma. The plasma is held in the center of the chamber by strong magnetic fields, which are created by running current through a set of coil windings around the chamber. The plasma is heated by injecting energy into it, either through particle beams or through electromagnetic waves.

The main advantage of MCF is that it has the potential to produce fusion reactions on a larger scale, making it more suitable for generating electricity. However, it is a more complex and costly process than ICF and there are still significant technical challenges to overcome before it can be considered a practical source of energy.

Both ICF and MCF have made significant progress in recent years and there are several experimental facilities around the world working on these technologies. However, achieving sustained fusion reactions with net energy production (meaning the energy produced by the fusion reactions is greater than the energy required to initiate and sustain the reactions) remains a major technical challenge.

There are also other approaches to fusion energy being explored, such as magnetized target fusion and muon-catalyzed fusion. However, these approaches are still in the early stages of development and it is not yet clear if they will be viable as a source of energy.

From the above, fusion energy has the potential to be a clean and abundant source of energy, but significant technical challenges must be overcome before it can be considered a practical source of energy.

SUMMARY OF INVENTION

According to the present invention, techniques related generally to fusion energy generation are provided. In particular, the present invention provides a system and method for fusion energy using a high intensity pulse or continuous wave (CW) laser generation system, and related methods. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

In an example, the present invention provides a laser fusion system. The system has a reactor housing, which includes an interior region maintained in a vacuum environment. The reactor housing creates a vacuum chamber. The system has a reaction region within a vicinity of a spatially center region of the reactor housing and a peripheral region formed within an interior of the reactor housing, the peripheral region surrounding the reactor region.

In an example, the system has a plurality of cavity regions (e.g., optical cavity regions) numbered from 1 through N within the interior region of the reactor housing (e.g., circular, dome, or other shaped structure) and spatially configured around the peripheral region such that each of the plurality of cavity regions extends from a first side of the peripheral region to a second side of the peripheral region. Preferably, the first side is opposing the second side along a straight line, and forms a linear path along a diameter of the interior region. In an example, the plurality of cavity regions forms a hub and spoke configuration. Each cavity region has a center region concentric with the reactor region and each cavity region has a first end coupled to the first side and a second end coupled to the second side of the peripheral region. In an example, N is greater than 10 and can be 100, 200, or thousands, although there may be fewer cavities in other examples.

In an example, a pair of mirrors are configured, respectively, on the first end and the second end of the cavity regions. In an example, a laser light source configured to emit electromagnetic radiation coupled to at least one of the pair of mirror devices such that a laser beam propagating from the laser light source between the pair of mirror devices increases in energy intensity from a first intensity to a second intensity to an $M^{th}$ intensity for M cycles of the laser beam propagating between the pair of mirror devices, where M is greater than 1,000 cycles, although there may be fewer or more.

In an example, the system has a fuel pellet or container comprising the fuel pellet inside disposed within the reactor region and is coupled to the plurality of cavity regions as each of the plurality of cavity regions spatially intersect within the reactor region to provide an energy level sufficient to ignite the fuel pellet for a fusion reaction.

In an example, the present invention provides a laser fusion system. The system has a reactor housing having an interior region maintained in a vacuum environment. In an example, the system has at least a pair of aperture regions spatially disposed along a periphery of the reactor housing, each of the aperture regions having an aperture size of A and a reaction region within a vicinity of a spatially center region of the reactor housing. In an example, the reaction region is characterized by a reactor length extending along a major cross-section of the reactor region. In an example, at least one cavity region in communication with the reaction region such that the optical cavity region is spatially disposed through the reaction region, configured through the pair of aperture regions opposing each other, and extending outside of the reaction region. In an example, a pair of mirrors is configured, respectively, on the first end and the second end of the cavity regions, each of the mirrors having a mirror size of W. A laser light source configured to emit electromagnetic radiation coupled to one of the pair of mirror devices such that a laser beam propagating from the laser light source between the pair of mirror devices within the cavity region increases in energy intensity from a first intensity to a second intensity to an Mth intensity for M cycles of the laser beam propagating between the pair of mirror devices, where M is greater than 1,000 cycles. In an example, the system has a fuel pellet or a container comprising the fuel pellet inside disposed within the reactor region and coupled to the cavity region to provide an energy level sufficient to ignite the fuel pellet for a fusion reaction and a ratio of W/A of at least 2 up to 500 configured to reduce any damage to one of mirror devices by reducing the aperture size to a predetermined dimension to prevent the radiation of the fusion reaction generated at a center of reaction region to interact with the mirror device through the cavity region.

Of course, one of ordinary skill in the art would recognize other variations, modifications, and alternatives.

Depending upon the example, the present invention can achieve one or more of these benefits and/or advantages. In an example, the present invention provides a fusion energy system including a high intensity pulse or CW laser system configured with a reactor in a compact and spatially efficient system and related methods. In an example, the high intensity pulse or CW laser system provides enough energy to ignite and sustain fusion energy within the reactor. In an example, the present invention offers advantages of generating fusion power through an efficient size, weight, and cost using the present high intensity lasers. These and other benefits and/or advantages are achievable with the present device and related methods. Further details of these benefits and/or advantages can be found throughout the present specification and more particularly below.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE EXAMPLES

In an example, according to the present invention, techniques related generally to fusion energy generation are provided. In particular, the present invention provides a system and method for fusion energy using a high intensity pulse or CW laser generation system, and related methods. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

Figure 1:
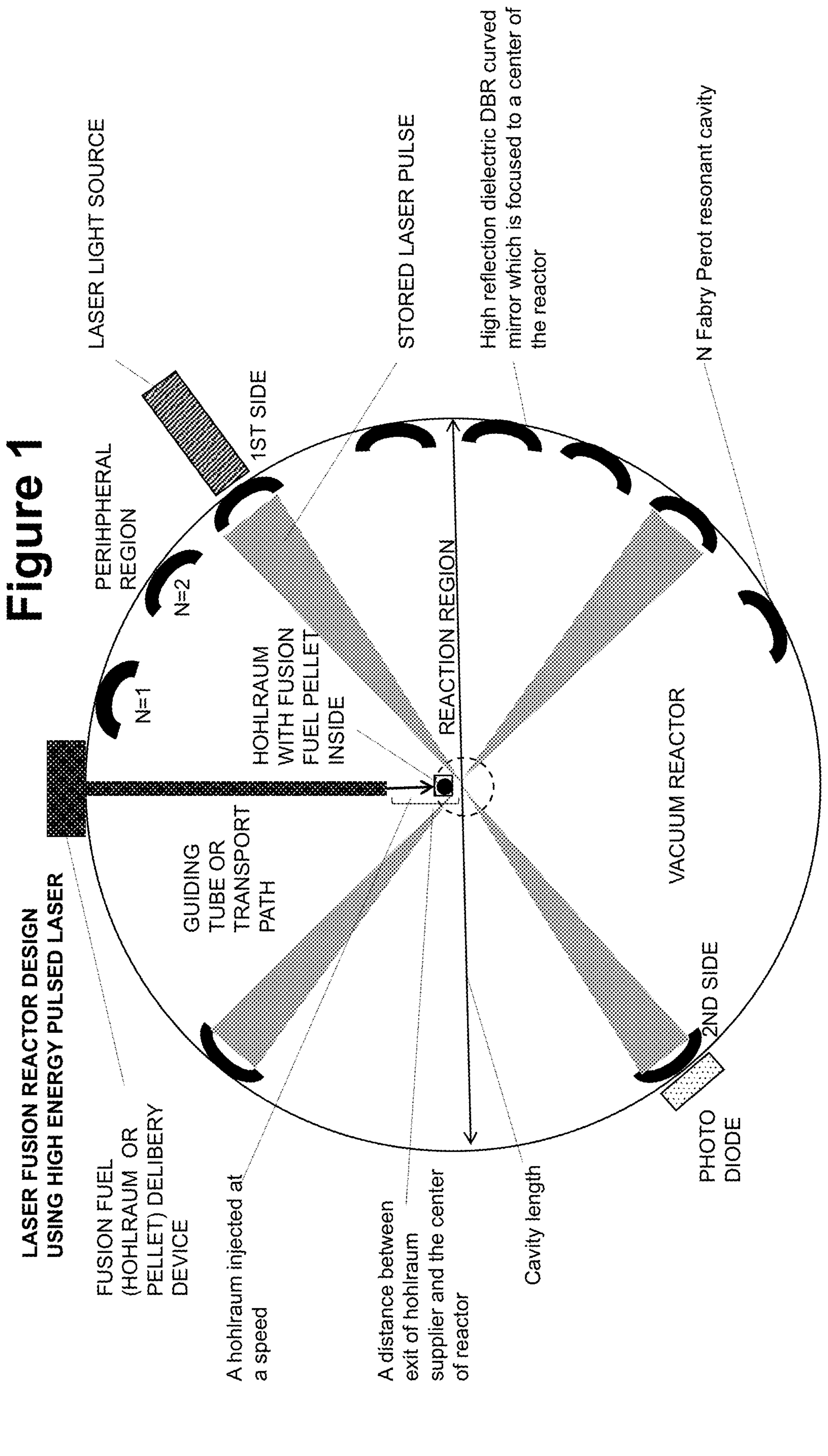
FIG. 1 is a simplified diagram of a laser fusion system according to an example of the present invention.

FIG. 1 is a simplified diagram of a laser fusion system according to an example of the present invention. As shown, the system has a plurality or N Fabry Perot resonant cavities, each of which is defined between a pair of mirror devices opposing each other in an example, The cavities are configured in a reactor housing. The reactor housing is maintained in a vacuum environment. Each cavity has a laser light source coupled to one end and a photo diode (or detector) coupled to the other end. Each of the cavities intersect in a center region to form a hub and spoke configuration. In an example, the system has a fuel pellet or hohlraum supply (or delivery) device, as shown. Each of the laser light sources is synchronized for a high-power pulsed laser to interact (or hit) the fuel pellet in a reaction region or center of a reactor housing. A sensing system, such as LIDAR (e.g., light detection and ranging) and video camera, can be used in conjunction with the laser light sources to synchronize delivering the high-power pulsed laser to the fuel pellet to initiate a fusion reaction. Further details of the present system can be found throughout the present specification and more particularly below.

Figure 2:
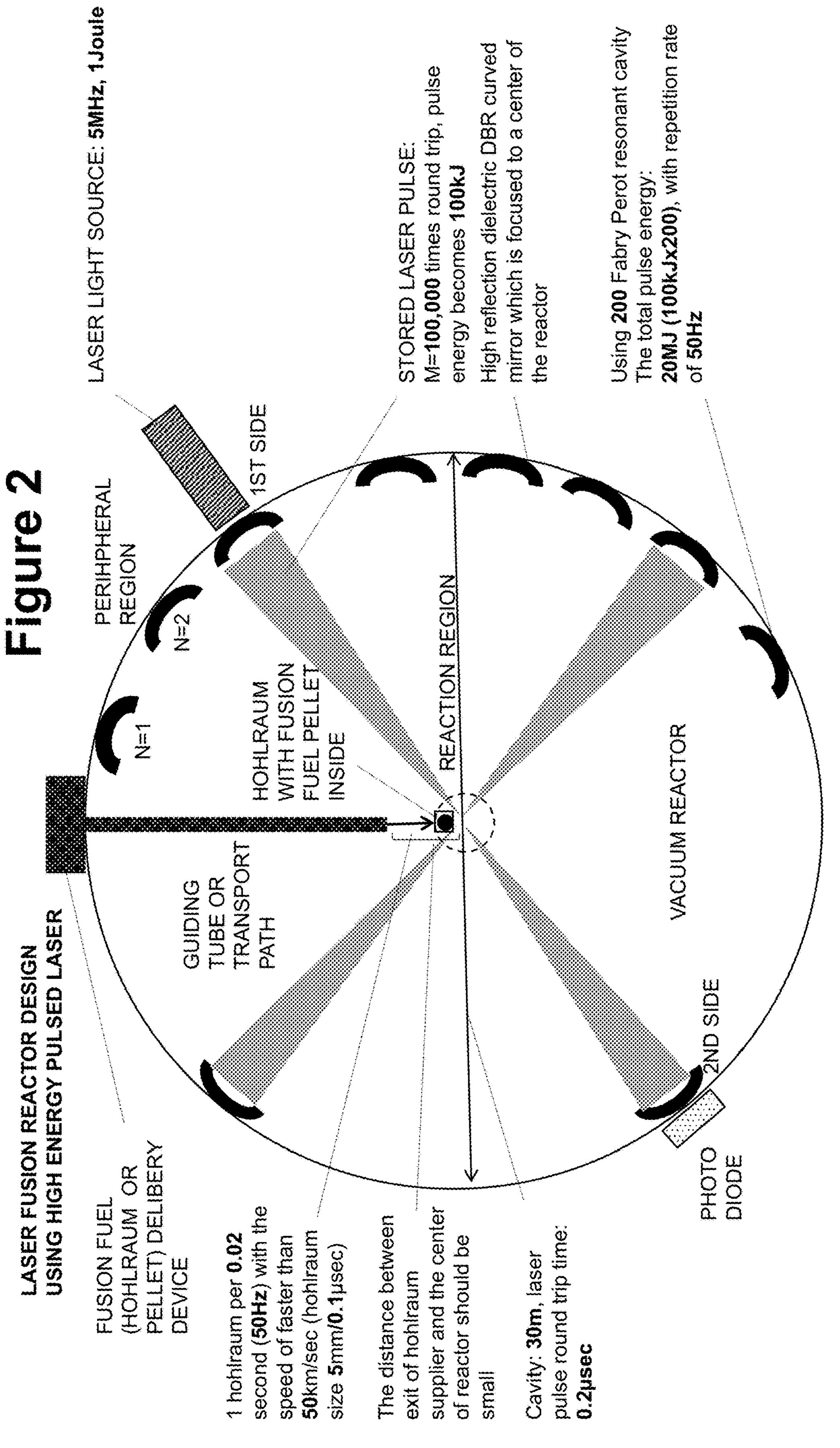
FIG. 2 is a simplified diagram of a laser fusion system of a cavity length of 30 m, and a high-power pulse laser of 100 kJ with a frequency of 50 Hz according to an example of the present invention.

FIG. 2 is a simplified diagram of a laser fusion system according to an example of the present invention. The system has a cavity length of 30 meters and uses a light source configured for 5 MHz and 1 Joule. As shown, the system has a reactor housing, which includes an interior region maintained in a vacuum environment, a plurality of cavities, each of which is formed between a pair of mirrors. Each pair of mirrors has a laser light source on one end and a photodetector on the other end. The system has a pellet supply (or delivery) device or hohlraum supply (or delivery) device, as shown.

In an example, the reactor housing is a vacuum chamber. In an example, a vacuum chamber is a sealed, airtight container that is used to create a vacuum, or a region with a very low pressure. Inside of the cavity is evacuated (or empty), which is a desired condition to increase the intensity of pulse or CW laser power. In an example, when air or another impurity is in the cavity, particles and waters in the air absorb or scatter the laser light, and the intensity of the laser light is decreased when laser light is propagating in the cavity. In a preferred example, the cavity is maintained in a vacuum.

The vacuum chamber is typically made of a material that is resistant to vacuum, high temperatures, and radiation, such as stainless steel, aluminum or other materials. It is designed to withstand the high radiation and high temperatures that are generated during the fusion reaction, as well as the intense radiation emitted by the fusion products.

In an example, the vacuum chamber is a component of a fusion reactor, as it helps to create the conditions that are necessary for the laser power to increase in the present invention. It also helps to protect the fusion reaction from external influences, such as air and other contaminants, which can interfere with the reaction as well as laser propagation. In an example, the vacuum environment can range from less than $10^{-5}$ torr to $10^{-3}$ torr. Of course, there can be other variations, modifications, and alternatives.

A laser light source configured to emit electromagnetic radiation coupled to at least one of the pair of mirror devices such that a laser beam propagating from the laser light source between the pair of mirror devices increases in energy intensity from a first intensity to a second intensity to an Mth intensity for M cycles of the laser beam propagating between the pair of mirror devices, where M is greater than 1,000 cycles.

To create the vacuum in the reactor housing, the vacuum chamber is evacuated using a high-capacity pump, which removes all of the air and other gases from the chamber. This process is known as pumping down the chamber, and it typically takes several hours or much more depending on the size of chambers to achieve the desired vacuum level. Once the vacuum has been achieved, the laser light source(s) is switched on, and pulse or CW laser power is increased in each cavity with a total number of N. The fuel pellet or the container which include the fuel pellet is injected through the tube, and the fusion reaction can begin. As shown, a number of N pairs of Fabry-Perot cavities intensify the pulse laser or CW laser inside of the reactor housing in the present invention.

In an example, the system has a reaction region within a vicinity of a spatially center region of the reactor housing. The reaction region is within the center region, as shown. The center region shows an intersection between a plurality of cavity regions.

The system has a peripheral region formed within an interior of the reactor housing as shown. The peripheral region surrounds the reactor region, and is preferably disposed along a largest diameter of the interior of the reactor housing. As shown, the system has a plurality of cavity regions numbered from 1 through N within the interior region of the reactor housing and spatially configured around the peripheral region such that each of the plurality of cavity regions extends from a first side of the peripheral region to a second side of the peripheral region. Preferably, the first side is opposing the second side along a straight line, and forms a linear path along a diameter of the interior region. In an example, the plurality of cavity regions forms a hub and spoke configuration. Each cavity region has a center region concentric with the reactor region and each cavity region has a first end coupled to the first side and a second end coupled to the second side of the peripheral region. In an example, N is greater than 10 and can be 100, 200, or thousands, although there may be fewer cavities in other examples. Each and every laser light source is synchronized with other, the fuel pellet delivery system, and photo detectors, for high power pulsed laser to hit the fuel pellet or the container in the reaction region.

As shown, a pair of mirrors are configured, respectively, on the first end and the second end of the cavity regions. Each pair of mirrors are spatially disposed along the peripheral region within the reactor housing. As shown, the system uses any combination of high reflection flat and curved optical mirror devices with a reflectivity of more than 99.99% or 99.999% to minimize an optical loss. In an example, a high reflection optical mirror is a device that reflects light in a specific direction. The device has a flat or curved surface, coated with a high reflective material, such as dielectric materials. The preferred high reflection optical mirror is a dielectric distributed Brag Reflector (DBR). In an example, the shape and curvature of the mirror determine the direction and intensity of the reflected light.

In the present invention, all of the high intensity laser beams are focused to a small spot in the center of the reactor or the reaction region to achieve a highest laser power density at the center by gathering all of a number of N high intensity laser beams after multiplying laser intensity M times at each cavity. At each cavity composed of a pair of mirrors, a laser light source configured to emit electromagnetic radiation coupled to at least one of the pair of mirror devices such that a laser beam propagating from the laser light source between the pair of mirror devices increases in energy intensity from a first intensity to a second intensity to an $M_{th}$ intensity for M cycles of the laser beam propagating between the pair of mirror devices.

In an example, a laser light source configured to emit electromagnetic radiation and form a high-power laser beams through each Fabry Perot cavity of inside of the reactor. In an example, the present system couples a high-power pulse or CW laser system to a fusion reactor to create a high-power energy source to initiate and perpetuate a fusion reaction. As an example, laser fusion is a process in which energy is generated through the fusion of atomic nuclei. The process occurs when the nuclei of two or more atoms are brought together and collide at high temperatures and high pressures, causing them to fuse together and release a large amount of energy. In the laser fusion process in an example, a high-energy laser beam is used to compress and heat a small pellet of fuel, typically a mixture of deuterium and tritium (two isotopes of hydrogen). The laser beam creates a shockwave that compresses the fuel by implosion, causing it to reach temperatures and pressures high enough for fusion to occur. During the fusion process, the atomic nuclei of the fuel atoms combine to form a heavier nucleus, releasing a large amount of energy in the form of light, momentum and heat. This energy can then be harnessed and used to generate electricity through the use of an electric generator, as noted. Further details of the present fusion system, and in particularly a high-power laser are provided throughout the present specification and more particularly below.

As an example, a high-power laser is a device that produces a highly concentrated and focused beam of light with a high level of power. The light produced by a high-power laser can have a variety of properties, such as wavelength, intensity, and coherence, which depend on the specific design and construction of the laser.

One type of high-power laser is the solid-state laser, which is made of a solid gain medium that is pumped by an external energy source, such as a flashlamp or another laser. The gain medium is typically a crystal, ceramics or glass rod that is doped with a rare earth element, such as neodymium or ytterbium, to amplify the laser beam. Solid-state lasers are highly efficient and can produce high power outputs, making them ideal for many industrial and scientific applications.

Another type of high-power laser is the gas laser, which uses a gas as the gain medium. Gas lasers can be further classified based on the type of gas used, such as helium-neon lasers, carbon dioxide lasers, and argon lasers. Gas lasers are highly reliable and have a long lifespan, making them suitable for continuous operation.

A high-power laser can also be a hybrid of the two aforementioned types, such as a fiber laser, which uses a doped fiber as the gain medium. Fiber lasers are highly efficient and can produce very high-power outputs, making them ideal for many industrial and scientific applications.

There are many factors that contribute to the performance and efficiency of a high-power laser, such as the gain medium, pump source, resonator design, and cooling system. The design and construction of a high-power laser can greatly impact its performance and suitability for a specific application. As an example, a high-power laser is a highly concentrated and focused beam of light with a high level of power, used in a wide range of applications.

In an example, the present invention provides a high intensity pulse or CW laser generation system. In an example, a high intensity pulse or CW laser is a type of laser that produces a highly concentrated and focused beam of light with a high level of power. The short pulse duration of a high intensity pulse laser allows for high peak power and the ability to deliver the high peak energy to a target in a very short period of time.

In an example, one type of high intensity pulse laser is the Q-switched laser, which uses a mechanical or electro-optical modulator to rapidly switch the laser beam on and off. This allows the laser to produce very short pulses, with pulse durations ranging from nanoseconds to picoseconds. Q-switched lasers are highly efficient and can produce very high peak powers, making them ideal for many industrial and scientific applications. Another type of high intensity pulse laser is the mode-locked laser, which uses a nonlinear optical element, such as a saturable absorber or a passive mode locker, to generate short pulses. Mode-locked lasers can produce very short pulses, with pulse durations ranging from femtoseconds to picoseconds. They are highly stable and can produce very high peak powers, making them ideal for many scientific and research applications.

There are many factors that contribute to the performance and efficiency of a high intensity pulse or CW laser, such as the gain medium, pump source, resonator design, and pulse generation method. The design and construction of a high intensity pulse or CW laser can greatly impact its performance and suitability for a specific application. In an example, a high intensity pulse laser is a type of laser that produces a highly concentrated and focused beam of light with a high level of power and a very short pulse duration. It is used in a wide range of applications. In an example, the present invention provides a high intensity pulse or CW laser generation system and related methods as described throughout the present specification and more specifically below.

As shown, the laser light source is coupled to at least one of the pair of mirror devices such that a laser beam propagating from the laser light source between the pair of mirror devices to increase energy intensity from a first intensity to a second intensity to an $M_{th}$ intensity for M cycles of the laser beam propagating between the pair of mirror devices. In an example, M is greater than 1,000 cycles, although there may be fewer or more.

As shown, there are several types of high reflection optical mirrors, each with specific properties and uses. Flat mirrors, also known as plane mirrors, have a flat reflecting surface and are used to reflect light in a straight line. In an example, concave mirrors have a curved inward reflecting surface and are used to focus light to a single point. In the present invention, concave mirrors are included to focus the high-power laser into a center of reactor. In an example, convex mirrors have a curved outward reflecting surface and are used to spread out light over a wider area to reduce the concentration of the laser power at the mirror surface and to avoid optical damage. In an example, optical mirrors can also be coated with specialized coatings, such as dielectric coatings or metallic coatings, to enhance their reflective properties and reduce surface defects, which causes optical absorption resulting in optical damages. These coatings can improve the efficiency and performance of the mirror, making it suitable for a specific application.

In an example, the system has a fuel pellet or a container comprising the fuel pellet inside disposed within the reactor region and is coupled to the plurality of cavity regions as each of the plurality of cavity regions spatially intersect within the reactor region to provide an energy level sufficient to ignite the fuel pellet for a fusion reaction. A tube or other fuel supply guiding component is configured from the fuel pellet or the container supply device to the reaction region. In an example, the container is a hohlraum, which will be described in more detail below.

In an example, the position of pellet or container is monitored by LIDAR and video camera and, feed back to the computer to synchronize with all of the laser light source, signals of photodiode located at backside of mirror, and the fuel pellet or the container delivery device.

In an example, the present system uses a plurality of high energy pulsed or CW lasers configured in the vacuum chamber to achieve a total of 1 Mega Joule (MJ)-20 MJ, 10 Tera Watt (TW)-10 Peta Watt (PW), or more energy. The cavity length can be 20 meters-10 K meters, but can be smaller or larger in other examples. The frequency of pellet or container delivery into the reaction region can be about 1 Hz-50 Hz and more or less in an example. The laser light source can each have a power of 0.01 Joule-100J, and a frequency of 100 KHz-100 Mega Hertz.

Figure 3:
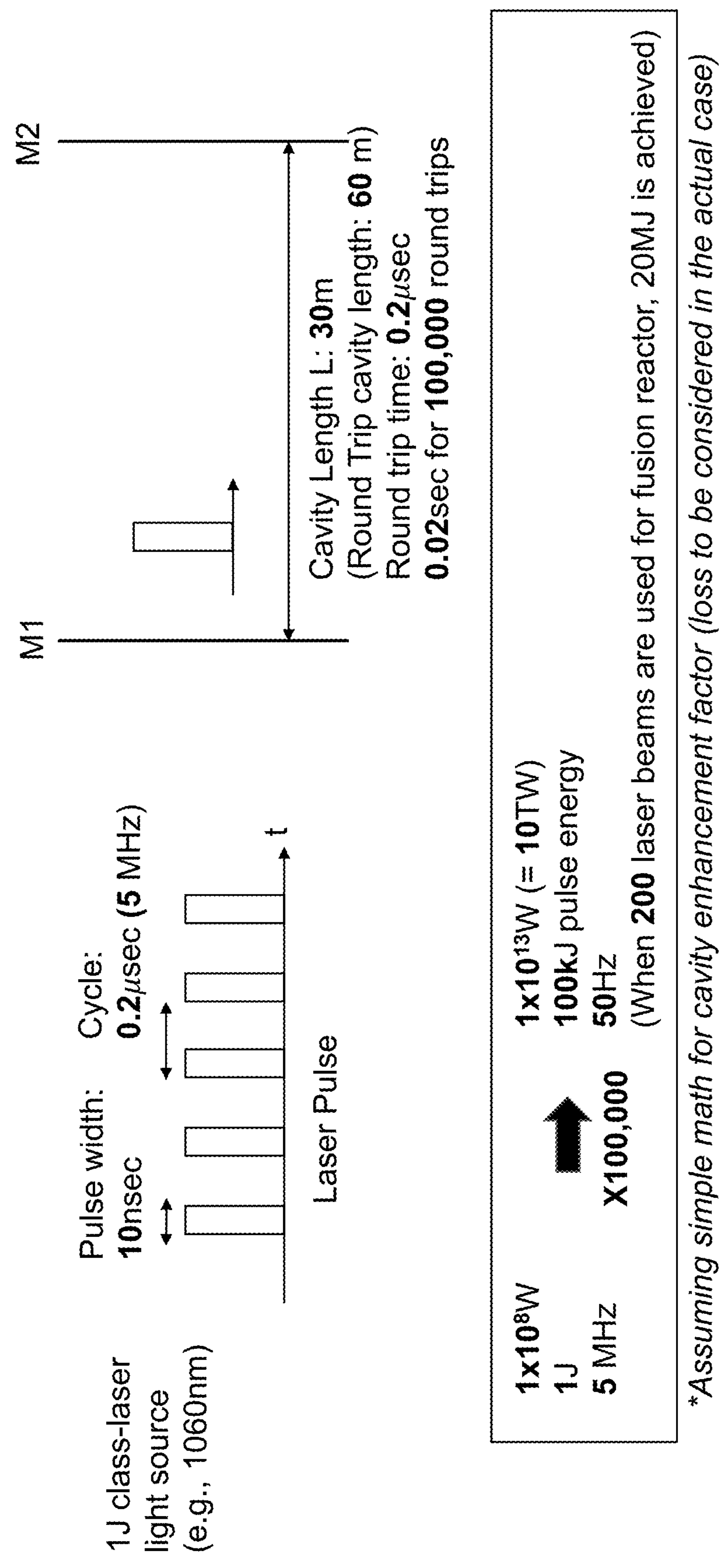
FIG. 3 illustrates simplified timing diagrams of a laser fusion system of FIG. 2 showing a cavity length of 30 m, and a high-power pulse laser of 100 kJ with a frequency of 50 Hz according to an example of the present invention.

For a 30-meter cavity length referring to the FIGS. 2 and 3, the round-trip time is 0.2 micro-seconds for a laser beam. The laser light source becomes with a frequency of 5 MHz (=1/(0.2 micro-seconds)). When pulse energy of the laser light source is 1 Joule, after the laser beam propagating between each pair of mirrors 100,000 times, a total energy of 100 Kilo Joules is ideally achieved in the cavity region with repletion rate of 50 Hz assuming mirror loss is ignored as shown. For 200 pairs of mirrors or cavities, we achieve a total energy of 20 Mega Joules at the reaction region. The repetition rate of high-power pulse of 20 Mega Joules becomes 50 Hz.

In an example, the tube has an opening or output within a vicinity of the reaction region. In an example, the fuel pellet or hohlraum has to be supplied to the center of the reactor region with a repetition rate of 50 Hz, which is synchronized with the frequency of 50 Hz of high-power pulse of all of the cavities to generate a fusion reaction. In an example, the distance between the opening to the reaction region ranges from 0.01 mm to 1 m and is preferably 0.01 mm to 20 mm.

In an example, the distance is the smaller between the opening to the reaction region to keep the hohlraum within a spatial profile to be balanced without tilting. In an example, the shape of inside of tube has configured to fit the shape of hohlraum to guide the hohlraum into the opening by keeping the same spatial profile and balance. Through the opening of the tube, the hohlraum is injected to the center region or reactor region of the reactor by keeping the balance without any tilt such that all of high-power laser beams targeted to both opening of hohlraum are irradiated to the surface of inside of hohlraum to generate X-rays through both opening of hohlraum as further described below. If the distance becomes larger, the balance or spatial profile of hohlraum is broken and tilted and, the high-power laser beams are not irradiated through both opening of hohlraum as described further. A pellet or hohlraum is sucked to the reaction region at high speed from a difference in pressure between the tube opening region and the fuel pellet delivery device or hohlraum delivery device in an example.

In an example using a hohlraum, when the hohlraum with diameter of 5 mm initiates contact the Fabry Perot cavity at an intersection where all of the high-power lasers are focused into a small spot at the center or reaction region of the reactor, a speed of 50 kilometers/second is desired. For a 30-meter cavity length, the round-trip time of the laser beam is 0.2 micro-seconds. When the hohlraum cross at the center of the cavity, a subsequent laser beam pulse is coming in 0.1 micro-seconds. Before the next pulse laser is achieved, the hohlraum passes though the cavity. Accordingly, a speed of more than 50 kilometers/second (5 mm/0.1 microseconds=50 km/second) is desired.

In another example, a fuel pellet is injected from the tube as a fuel to generate a direct fusion reaction (without X-ray irradiation from the hohlraum), the speed of the pellet is more than 10 kilometers/second (1 mm/0.1 microseconds=50 km/second). Thus, a high energy pulse of 100 kilo Joule with a frequency of 50 Hz with the cavity length of 30 meters is illustrated.

In an example, the high speed of the hohlraum or the pellet can range from 0.5 kilometers per second to 60 kilometers per second, but is preferably range of 2-50 kilometers per second depending of the size of hohlraum or pellet which cross the Fabry Perot cavity at the center of the reactor. The high speed can range less than 1 kilometer per second if the cavity length is more than 1.5 km and the roundtrip time is more than 10 micro-second. Of course, one of ordinary skill in the art would recognize other variations, modifications, and alternatives.

Figure 4:
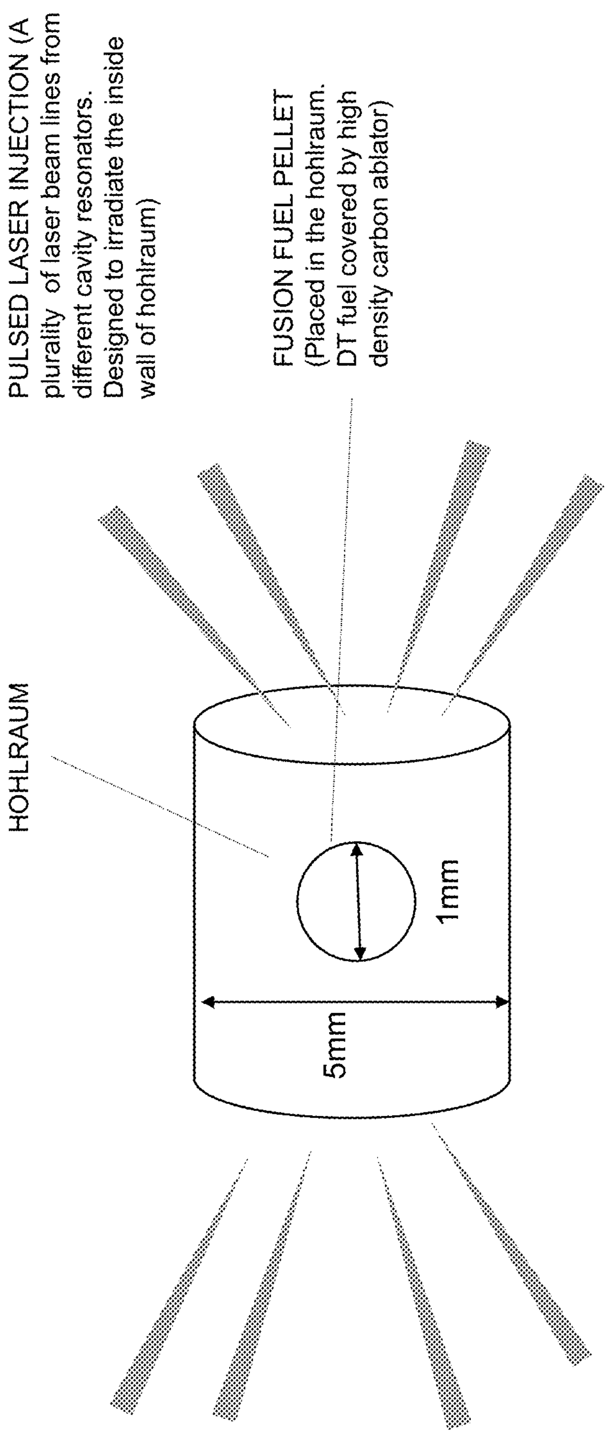
FIG. 4 is a simplified diagram of a hohlraum device according to an example of the present invention.

FIG. 4 is a simplified diagram of a hohlraum device according to an example of the present invention. As shown, the hohlraum device encloses the fuel pellet inside. In an example, a hohlraum is a hollow, cylindrical cavity that is used as a radiation or energy source in a fusion reactor. It is typically made of a high-Z material, such as gold or tungsten, which absorbs and re-emits high-energy photons, such as x-rays. The hohlraum is used to create conditions that generate a fusion, such as high temperatures and pressures, by irradiating the interior with high-power lasers to generate X-rays and irradiating fuel pellet cell by X-rays. This process is known as indirect-drive fusion, and it is typically used in inertial confinement fusion (ICF) systems.

In an ICF fusion reactor, the hohlraum contain a fuel capsule inside which contains such as deuterium and tritium. When the inside wall of hohlraum is irradiated with high-energy photons (high-power lasers) as shown, X-rays are generated by irradiation of high energy lasers, and then the fuel capsule is heated to the point where the deuterium and tritium nuclei fuse together, releasing a large amount of energy in the process. The energy released by the fusion reaction is then used to generate electricity, which can be used to power homes and businesses. Instead of deuterium and tritium, other low-Z martials, e.g., helium, lithium, and boron etc. can be applied.

The design of the hohlraum is important to the success of the fusion reaction, as it determines the conditions under which the fuel capsule is irradiated. Factors such as the size and shape of the hohlraum, the materials used to construct it, and the intensity and duration of the photon irradiation must be carefully considered to achieve the desired fusion conditions.

The hohlraum can be surrounded by conducting coil, which generates magnetic field to enhance high density and temperature plasma confinement during implosion.

The fuel pellet cell can be imploded to ignite the nuclear fusion reaction without hohlraum if the laser-induced implosion pressure is enough high to suppress variety of instabilities during implosion. This process is known as direct-drive fusion.

The hohlraum three-dimensional design have a various type of cylindrical, spherical, and hemisphere, which has aperture to receive high power pulse lasers.

Using 30 m cavity length and the same size of reactor, high power pulse laser of 100 kJ with a frequency of 50 Hz is achieved as described. For other applications, 10 Hz is desired for continuous laser fusion to supply enough energy continuously. Further details of examples of the present invention can be found throughout the present specification and more particularly below.

Figure 5:
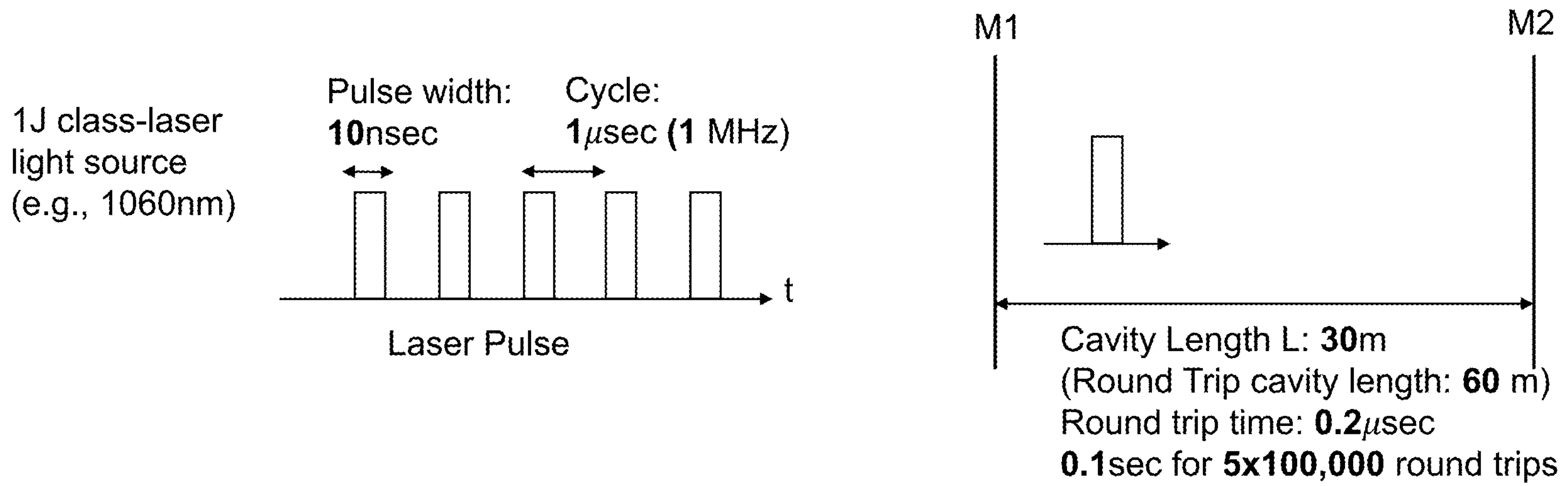
FIG. 5 illustrates simplified timing diagrams of a laser fusion system of FIG. 2 showing a cavity length of 30 m, and a high-power pulse laser of 100 kJ with a frequency of 10 Hz according to an example of the present invention.

Referring to FIG. 5, we demonstrate a high-power pulse laser with the frequency of 10 Hz using a short cavity of 30 meters. As the laser light source, the frequency of 1 MHz (pulse repletion rate of 0.1 micro-second) and the pulse energy of 1 Joule is included. A round-trip time of 30-meter cavity is 0.2 micro-seconds. Every five-round trip, the pulse energy in the cavity is increased from the first intensity to a second intensity to an Mth intensity for 5 M cycles of the laser beam propagating between the pair of mirror devices. By a total of 500,000 times round trip, an input pulse energy of 1 Joule becomes 100 kilo Joules as shown.

Figure 6:
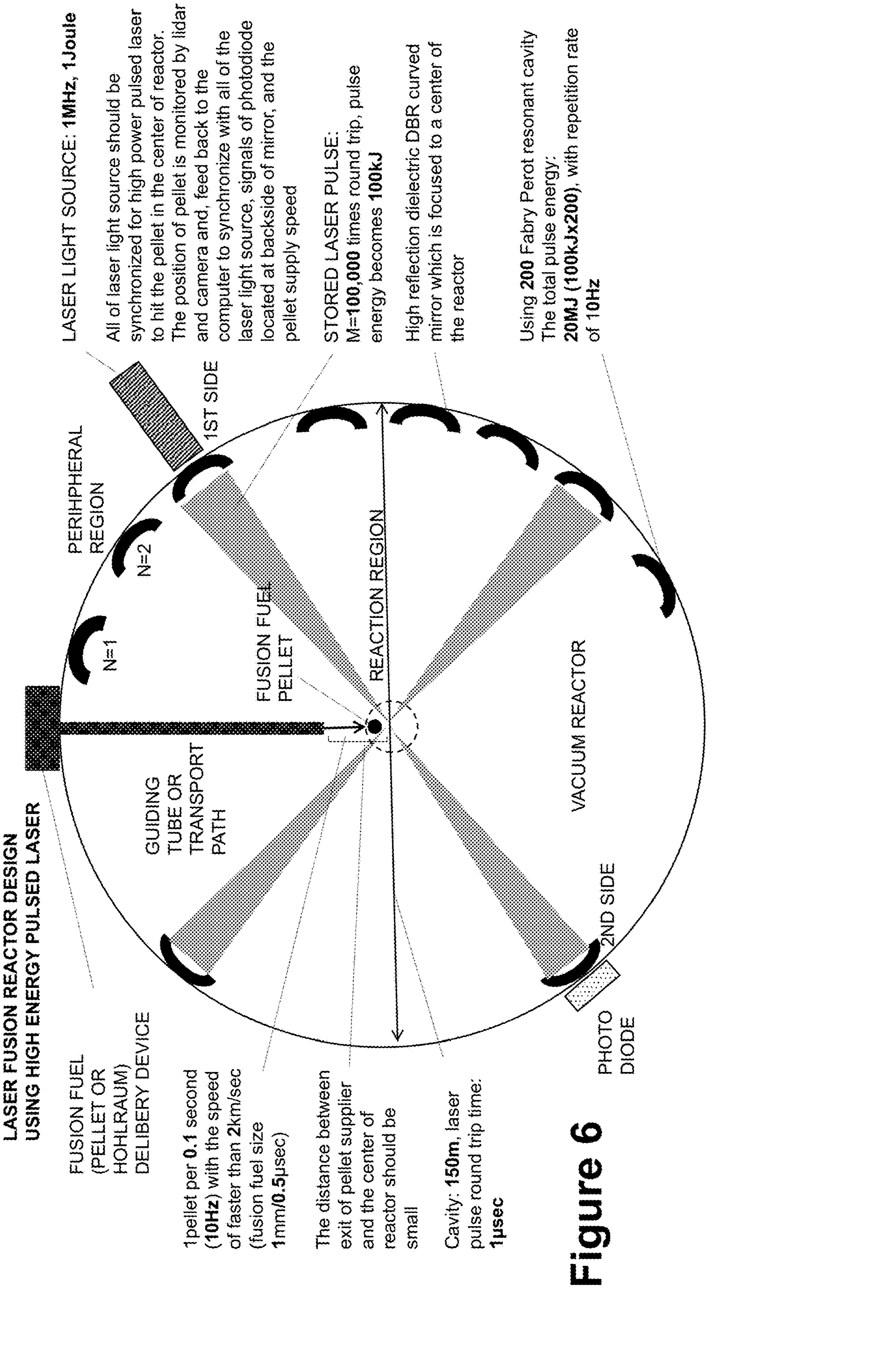
FIG. 6 is a simplified diagram of a laser fusion system of a cavity length of 150 m, and high-power pulse laser of 100 kJ with a frequency of 10 Hz according to an example of the present invention.
Figure 7:
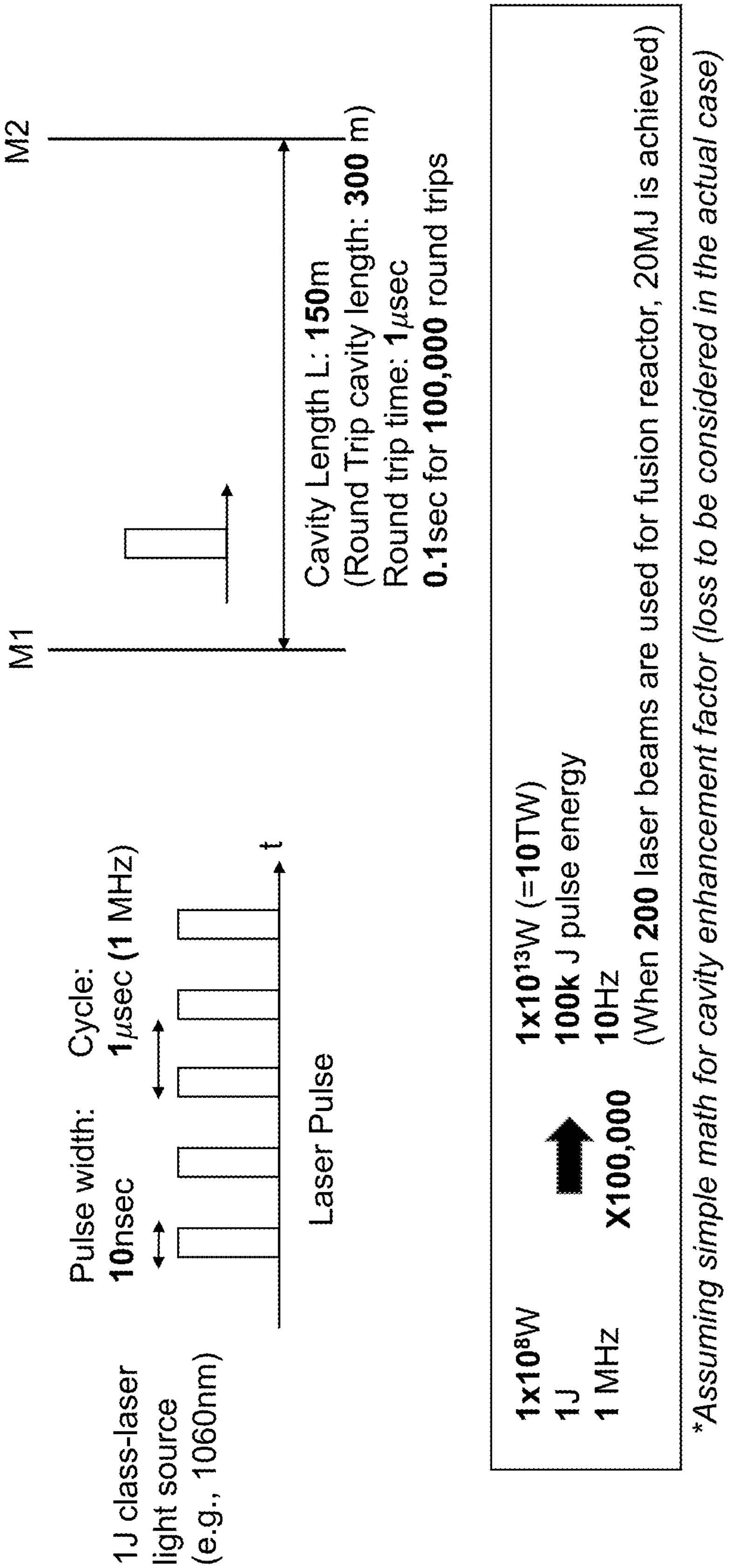
FIG. 7 illustrates simplified timing diagrams of a laser fusion system of FIG. 6 showing a cavity length of 150 m, and a high-power pulse laser of 100 kJ with a frequency of 10 Hz according to an example of the present invention.

FIGS. 6 and 7 illustrate a high-power pulse laser with 10 Hz repletion rate by 100,000 round-trip. As discussed, the 30-meter cavity requires 500,000 round trip to achieve the high-power pulse of 100 kJ with the frequency of 10 Hz from the laser light source of 1 Joule. An additional 400,000 round trip contributes to increase the loss from the cavity. As shown, a high power pulse laser with the repetition frequency of 10 hz by 100,000 times round-trip is achieved using 150 meter cavity length.

For the 150-meter cavity length, the round-trip time is 1 micro-seconds for a laser beam. The laser light source has a frequency of 1 MHz (=1/(1 micro-second)). When pulse energy of the laser light source is 1 Joule, after the laser beam propagating between each pair of mirrors 100,000 times, a total energy of 100 Kilo Joules is achieved (ideally) in the cavity region with repetition rate of 10 Hz assuming mirror loss is ignored. Using 200 pairs of mirrors or cavities, the present system achieves a total energy of 20 Mega Joules at the reaction region. The repetition rate of high-power pulse of 100 Kilo Joule is 10 Hz.

As shown in an example, a one (1) Joule class laser source is included. The laser source is configured for, for example, 1060 nm but can be other wavelengths such as 530 nm and 350 nm. The laser pulse has a length of ten (10) nanoseconds or 1-10 nanoseconds. The cycle is 1 micro-second (or 1 MHz). In an example, one hundred thousand (100,000) cycles or round trips are generating a high-power laser pulse of 100 kilo Joule in a cavity according to the present invention. The cavity length is, for example, one hundred fifty (150) meters equating to a round trip cavity length of three hundred (300) meters. The round-trip time is 1 micro-second, and 0.1 of a second creates one hundred thousand round trips. For the one hundred thousand round trips, we generate $1\times10^{13}$ Watts (or 10 Terra Watt) or one hundred (100) Kilo Joules of pulse energy at ten (10) Hz as shown in FIG. 6. When two hundred laser beams are used together for a fusion reactor, twenty (20) Mega Joule is achieved. For continuous laser fusion or commercially available laser fusion to supply enough electricity continuously, a Mega Joule pulse is required at 10 Hz repetition rate in an example. Using present invention, it is possible to make the Mega Joule pulse with the repetition rate of 10 Hz by using the present system and methods. Presently, Lawrence Livermore National laboratory could generate only one pulse with a Mega Joule energy per day.

In an example, the tube has an opening or output within a vicinity of the reaction region. The fuel pellet or hohlraum is supplied to the center or reaction region of the reactor with a repetition rate of 10 Hz, which is synchronized with the frequency of 10 Hz of high-power pulse by concentrating all of high-power lasers from each cavity to the center of reactor to generate a fusion reaction. In an example, the distance between the tube opening to the reaction region ranges from 0.01 mm to 1 m and is preferably 0.01 mm to 20 mm. The distance is the smaller to maintain the hohlraum in a spatial configuration (orientation) and balance without tilting. The shape of inside of tube is configured to fit the shape of hohlraum to maintain a spatial orientation and balance of the hohlraum during the process of guiding the hohlraum inside of tube. The hohlraum is dispensed through the opening of the tube and the hohlraum is injected to the center region of the reactor by maintaining the spatial orientation and balance without any tilt such that all of the high-power laser beams targeted to the hohlraum are irradiated to the surface of inside of hohlraum to generate X-rays through both of openings of the hohlraum. If the distance from the opening to the reaction region becomes undesirably larger, the balance of hohlraum is not maintained and tilted and, the high-power laser beams are not irradiated uniformly through both of openings of hohlraum, which lead to reduce the X-ray generation rate and not to generate a fusion reaction from the fuel pellet cell.

In an example, the pellet or hohlraum is dispensed (or sucked) into the reaction region at a high speed from a difference in pressure between the tube opening region and the fuel pellet delivery device or hohlraum delivery device. The pellet or hohlraum is placed in and connected to the tube inside of the delivery or supply device at an atmospheric pressure. The delivery or supply device is placed outside of reactor at atmospheric pressure. The gate or valve in the tube which is separated between the vacuum in the reaction region and atmospheric pressure is opened, and the fuel pellet or hohlraum is transferred via suction into the reaction region at a high speed.

In an example, when the hohlraum with diameter of 5 mm, interacts with the the Fabry Perot cavity at the intersection of all of the high-power lasers focused into a small spot at the center of the reactor, a speed of 10 kilometers/second is desired. For a 150-meter cavity length, the round-trip time of the laser beam is 1 microsecond. When the hohlraum cross at the middle of the cavity, a subsequent laser beam is coming within 0.5 micro-seconds. Before next pulse laser, the hohlraum has to pass though the cavity region. A hohlraum speed of more than 10 kilometers/second (5 mm/0.5 microseconds=10 km/second) is desired.

In another example, the fuel pellet is injected from the tube as a fuel to generate the direct fusion reaction using the high-power lasers without X-rays from the hohlraum, the speed of pellet is more than 2 kilometers/second (1 mm/0.5 microseconds=2 kilometers/second). A high energy pulse of 100 kilo Joules with a frequency of 10 Hz with the cavity length of 150 m is achieved. In an example, the high speed of hohlraum or pellet can range from 2 kilometers per second to 10 kilometers per second, but is preferably more than 2-10 kilometers per second depending on size (diameter) of hohlraum or pellet which intersects the Fabry Perot cavity at the center or reaction region of the reactor.

On the 150-meter cavity length, the round-trip time is 1 micro-seconds for a laser beam. In an example, the laser light source is with a frequency of 1 MHz (=1/(1 micro-second)). When pulse energy of the laser light source is 1 Joule, after the laser beam propagating between each pair of mirrors 100,000 times, a total energy of 100 Kilo Joules is achieved ideally with repletion rate of 10 Hz assuming mirror loss in the cavity region has been ignored. For 200 pairs of mirrors or cavities, a total energy of 20 Mega Joules is achieved at the reaction region. The repetition rate of high-power pulse of 100 Kilo Joules is 10 Hz.

In an example, a pellet or hohlraum is delivered (or sucked) to the reaction region at high speed from a difference in pressure between the tube opening region (vacuum) and the fuel pellet delivery device or hohlraum delivery device. The supply device has a pressure that is an atmospheric pressure. The fuel pellet supply device or hohlraum supply device is located outside of the vacuum reactor. When the hohlraum with diameter of 5 mm cross the Fabry Perot cavity at the intersection where all of the high-power lasers are focused into a small spot at the center of the reactor, a speed of 10 km/second is desired. As noted, for a 150-meter cavity length, the round-trip time of the laser beam is 1 micro-seconds. When the hohlraum cross at the middle of the cavity, the subsequent laser beam pulse is coming in 0.5 micro-seconds. Before next pulse laser, the hohlraum passes though the cavity region. A speed of more than 10 kilometers/second (5 mm/0.5 microseconds=10 kilometers/second) is desired.

Instead of the hohlraum, the fuel pellet is injected from the tube as a fuel to generate a direct fusion reaction without the X-ray irradiation from the hohlraum, the speed of pellet is more than 2 kilometers/second (1 mm/0.5 microseconds=2 kilometers/second). A high energy pulse of 100 kilo Joule with a frequency of 10 Hz with the cavity length of 150 m is illustrated. The high speed of hohlraum and pellet can range from 10 kilometers per second to 2 kilometers per second, but is preferably more than 2~10 kilometers per second depending of size or diameter of hohlraum and pellet which cross the Fabry Perot cavity at the center of the reactor.

In an example with the cavity length of 150 meters and reactor diameter 150 meters, an advantage of such 150 m cavity length is that the high-power pulse laser has a repetition frequency of 10 Hz, which is lower. Another advantage is that high reflection mirrors are located at a distance of 75 meters from the center of the reactor, which is far away enough from the fusion reaction region to prevent damage to the mirrors. That is, the damage to the mirrors caused by the radiation of nuclear fusion reaction is reduced.

Figure 8:
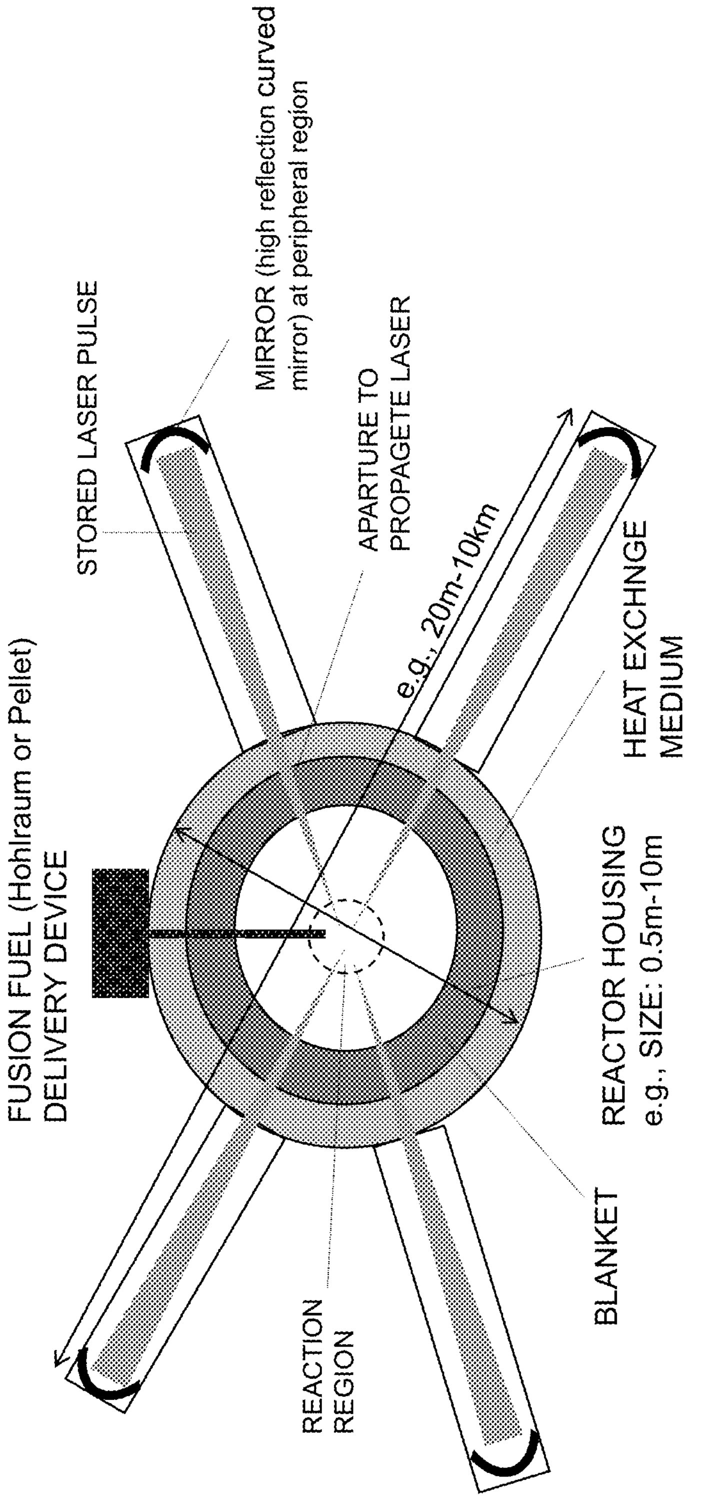
FIG. 8 is a simplified diagram of a laser fusion system, including mirrors coupled to longer cavity lengths than a diameter length of an inner reactor housing, according to an example of the present invention.

FIG. 8 is a simplified diagram of a laser fusion system, including mirrors coupled to longer cavity lengths than a diameter length of an inner reactor housing, according to an example of the present invention. As shown, the system has a reactor housing (e.g., chamber), blanket structure, heat exchange medium, delivery device, reaction region, and a plurality of caviry regions. Each of the cavity regions is configured with a pair of mirrors. A laser light source is configured to one mirror and a photo diode sensing device is configured with the other mirror opposing the laser light source.

In an example, the reactor chamber can be small with the diameter ranging from 0.5 meter to 10 meters, but can be smaller or larger. In an example, the blanket structure and heat exchange medium are inside or outside of small reactor chamber to absorb the fusion energy effectively. In an example, as shown, the mirrors are located at 75 meters, which can be more or less, away from the center of the small reactor to make the 150 meter cavity with a pair of mirrors to achieve a high-power pulse with the repetition rate of 10 Hz as discussed. Also, mirror damage caused by radiation of fusion reaction at the center of the reactor is reduced because the mirror is located at the distance of 75 meters from the center of the reactor. Also, volume of the reactor and cavity region is much smaller than the aforementioned examples. The vacuum pump is smaller and can achieve desirable vacuum conditions within a shorter time frame.

Figure 9:
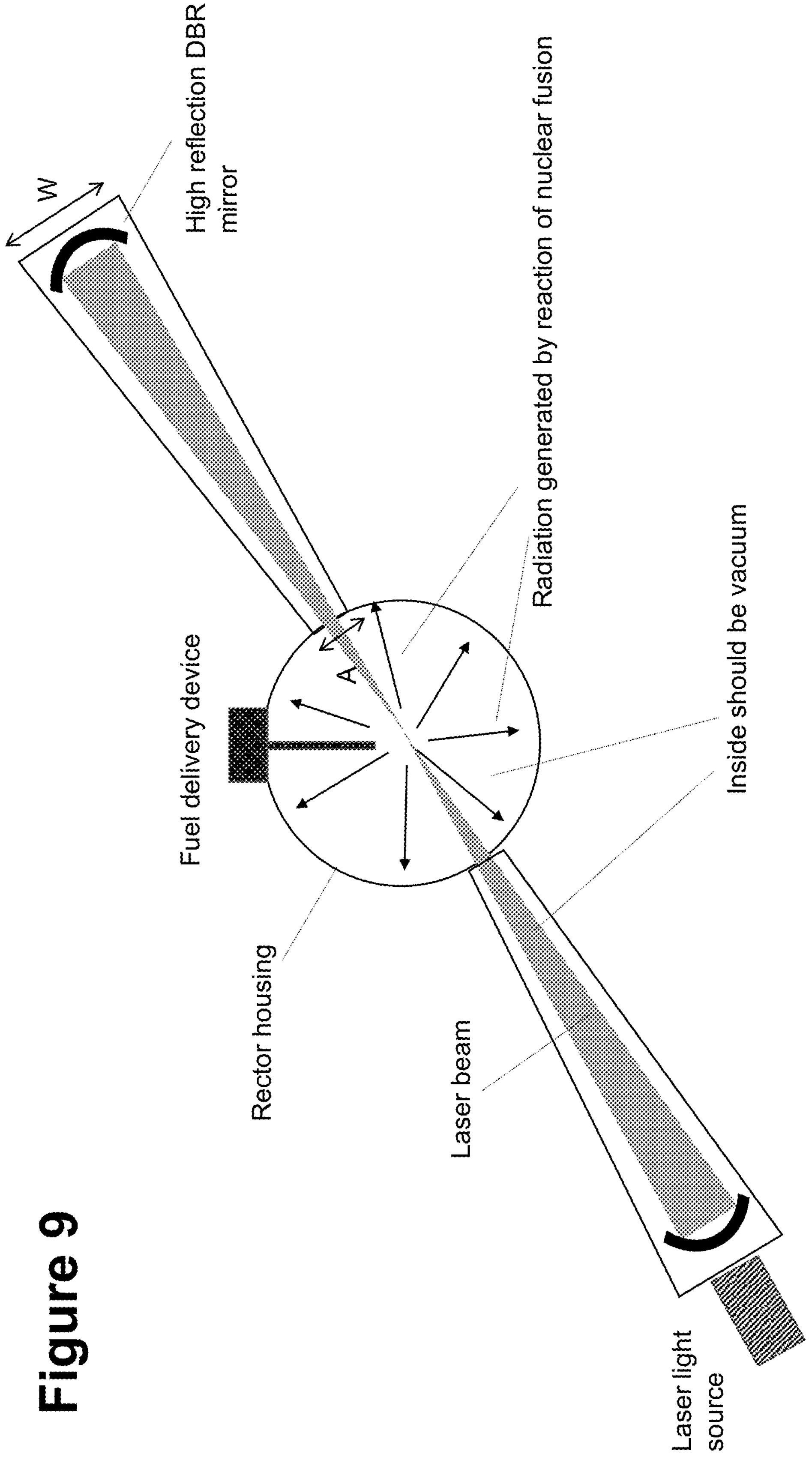
FIG. 9 is a simplified diagram of a laser fusion system, including a pair of mirrors coupled to a longer cavity length than a diameter length of an inner reactor housing, according to an example of the present invention.

FIG. 9 is a simplified diagram of a laser fusion system, including a pair of mirrors coupled to a longer cavity length than a diameter length of an inner reactor housing, according to an example of the present invention. As shown, the pair of mirrors define each cavity region. Each cavity extends through an aperture region in communication with the interior of the reaction chamber. A plurality of cavities intersect at the reaction region of the reactor housing.

In an example, the laser fusion system is illustrated. The system has a reactor housing having an interior region maintained in a vacuum environment. In an example, the system has at least a pair of aperture regions spatially disposed along a periphery of the reactor housing. In an example, each of the aperture regions has an aperture size of A and a reaction region within a vicinity of a spatially center region of the reactor housing. In an example, the reaction region is characterized by a reactor length extending along a major cross-section of the reactor region. In an example, at least one cavity region in communication with the reaction region such that the optical cavity region is spatially disposed through the reaction region, configured through the pair of aperture regions opposing each other, and extending outside of the reaction region. In an example, a pair of mirrors is configured, respectively, on the first end and the second end of the cavity regions, each of the mirrors having a mirror size of W. A laser light source configured to emit electromagnetic radiation coupled to one of the pair of mirror devices such that a laser beam propagating from the laser light source between the pair of mirror devices within the cavity region increases in energy intensity from a first intensity to a second intensity to an Mth intensity for M cycles of the laser beam propagating between the pair of mirror devices, where M is greater than 1,000 cycles. In an example, the system has a fuel pellet or a container comprising the fuel pellet inside disposed within the reactor region and coupled to the cavity region to provide an energy level sufficient to ignite the fuel pellet for a fusion reaction and a ratio of W/A of at least 2 up to 500 configured to reduce any damage to one of mirror devices by reducing the aperture size to a predetermined dimension to prevent the radiation of the fusion reaction generated at a center of reaction region to interact with the mirror device through the cavity region.

Figure 10:
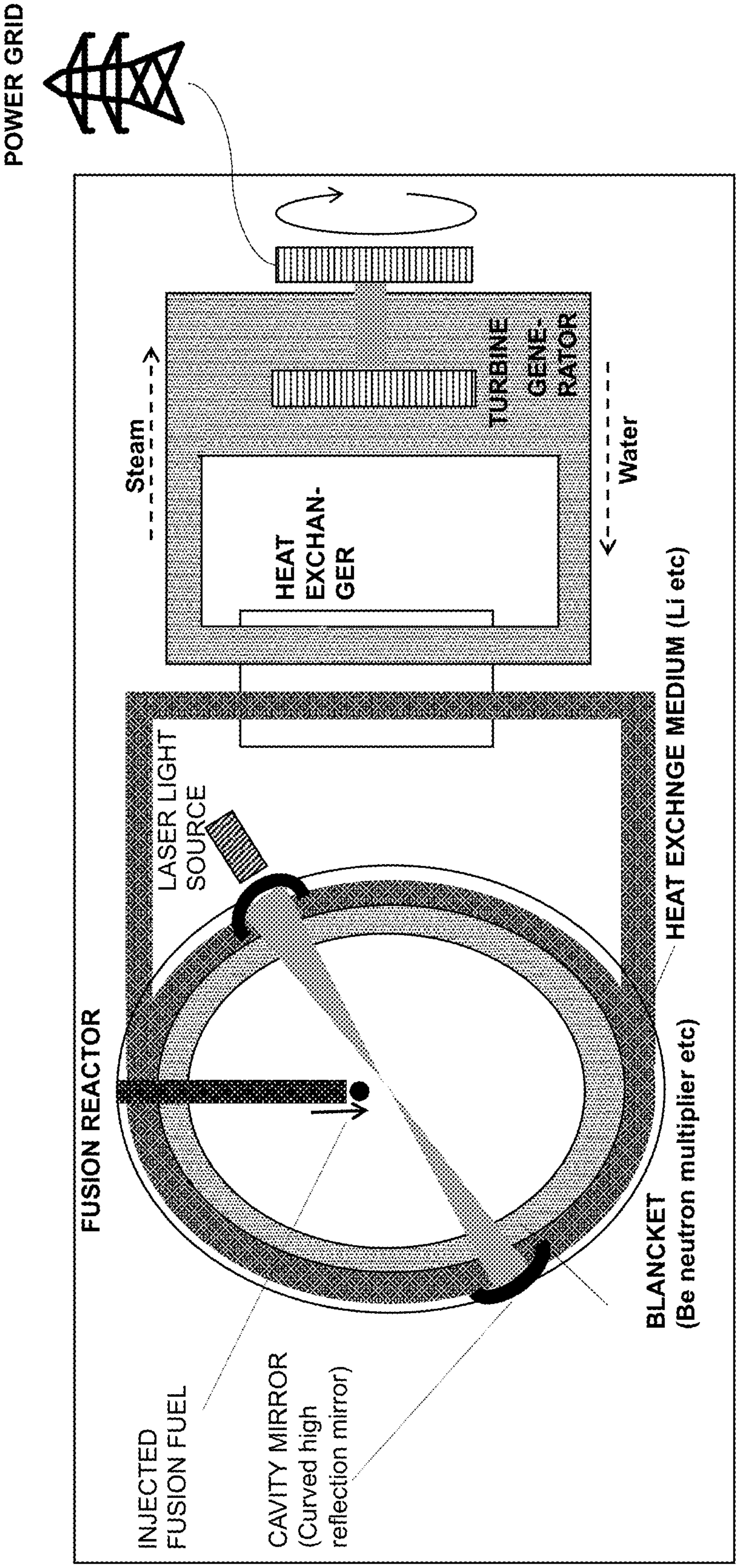
FIG. 10 is a simplified diagram of a fusion reactor configured for power generation according to an example of the present invention.

FIG. 10 is a simplified diagram of a laser fusion system according to an example of the present invention. As shown, the system has a high-power pulse laser system, which is configured with a fusion reactor. The fusion reactor includes a pellet or hohlraum within a blanket structure, which could absorb the fusion energy including the momentum energy of neutron, helium and tritium to generate a thermal energy, and some of neutrons are used to multiply tritium for reuse as a fuel.

Then, the thermal energy is transferred to the surrounding heat exchange medium. The blanket is surrounded by a heat exchange medium which is configured to transfer thermal energy from the blanket to the medium. The heat exchange material must be able to circulate the tube to travel to heat exchange systems connecting to heat exchanger. The heat exchanger transfers the thermal energy from the medium to water to generate the high-pressure steam, which rotates a turbine. The rotation of the turbine in a magnetitic field generate the electricity, and then it works as an electric generator for use on a power grid for a private or public power system.

In an example, the system includes a blanket structure. A blanket structure lining a fusion reactor is a layer of material that is used to surround the plasma in the fusion reaction chamber. The primary function of the blanket structure is to provide structural support for the plasma and to protect the plasma from the walls of the reaction chamber. The blanket structure is also responsible for transferring the heat generated by the plasma to a heat exchange medium. The blanket including beryllium microsphere is effective to multiply tritium by absorbing some of neutrons.

There are several factors to consider when designing a blanket structure for a fusion reactor. One important factor is the material used for the blanket structure. The material must be able to withstand the high temperatures and pressures of the plasma, as well as the radiation generated by the reaction. Materials that are commonly used for the blanket structure include refractory metals such as tungsten and molybdenum, as well as alloys such as stainless steel and Hastelloy.

Another factor to consider is the thickness of the blanket structure. The thickness of the blanket structure should be sufficient to provide structural support for the plasma and to protect it from the walls of the reaction chamber, but it should not be so thick as to inhibit the transfer of heat from the plasma to the cooling system.

The blanket structure should also be designed with the geometry of the fusion reactor in mind. The blanket structure should be able to conform to the shape of the plasma and the reaction chamber, and it should be able to accommodate any changes in the shape of the plasma as the reaction progresses. Preferably, the blanket structure includes the layer containing beryllium microsphere or $Li_2TiO_3$, among other compounds, to multiply a tritium material.

Overall, the ideal blanket structure for a fusion reactor would be made of a material that is able to withstand the high temperatures and pressures of the plasma, and it would be of a sufficient thickness to provide structural support and protection for the plasma while also allowing for the efficient transfer of heat to the heat exchange medium. In an example, the blanket structure has a thickness of 0.1 m to 1 m. The blanket first wall structure is made of a suitable material such as reduced activation ferritic steel (e.g., RAF; Reduced Activation Ferritic/Martensitic Steel), vanadium alloy (e.g., V-4Cr-4Ti; V alloy), silicon carbide composite (e.g., SiC/SiC composite), including combinations thereof.

In an example, a heat exchange material is configured surrounding the blanket structure. In an example, a heat exchange material for a fusion reactor is a substance that is used to transfer heat from the plasma, the ionized gas and all types of radiations from the fusion reaction, to a cooling system.

There are several factors to consider when selecting a heat exchange material for a fusion reactor. One important factor is the material's thermal conductivity, which is a measure of its ability to transfer heat. Materials with high thermal conductivity are more effective at transferring heat and are therefore more suitable for use in a fusion reactor. Some examples of materials with high thermal conductivity include metal materials.

Another factor to consider is the material's melting point. The heat exchange material must be able to circulate the tube to travel to heat exchange systems where the heat is transferred to water, the water becomes steam and then connecting to a usual steam turbine system. This requires the material to have a low melting point. Materials with low melting points include lithium and sodium.

Overall, the ideal heat exchange material for a fusion reactor would have high thermal conductivity, a low melting point, and good resistance to corrosion and erosion. In an example, the heat exchange material can be any suitable material such as lithium and sodium. Of course, there can be other variations, modifications, and alternatives.

Figure 11:
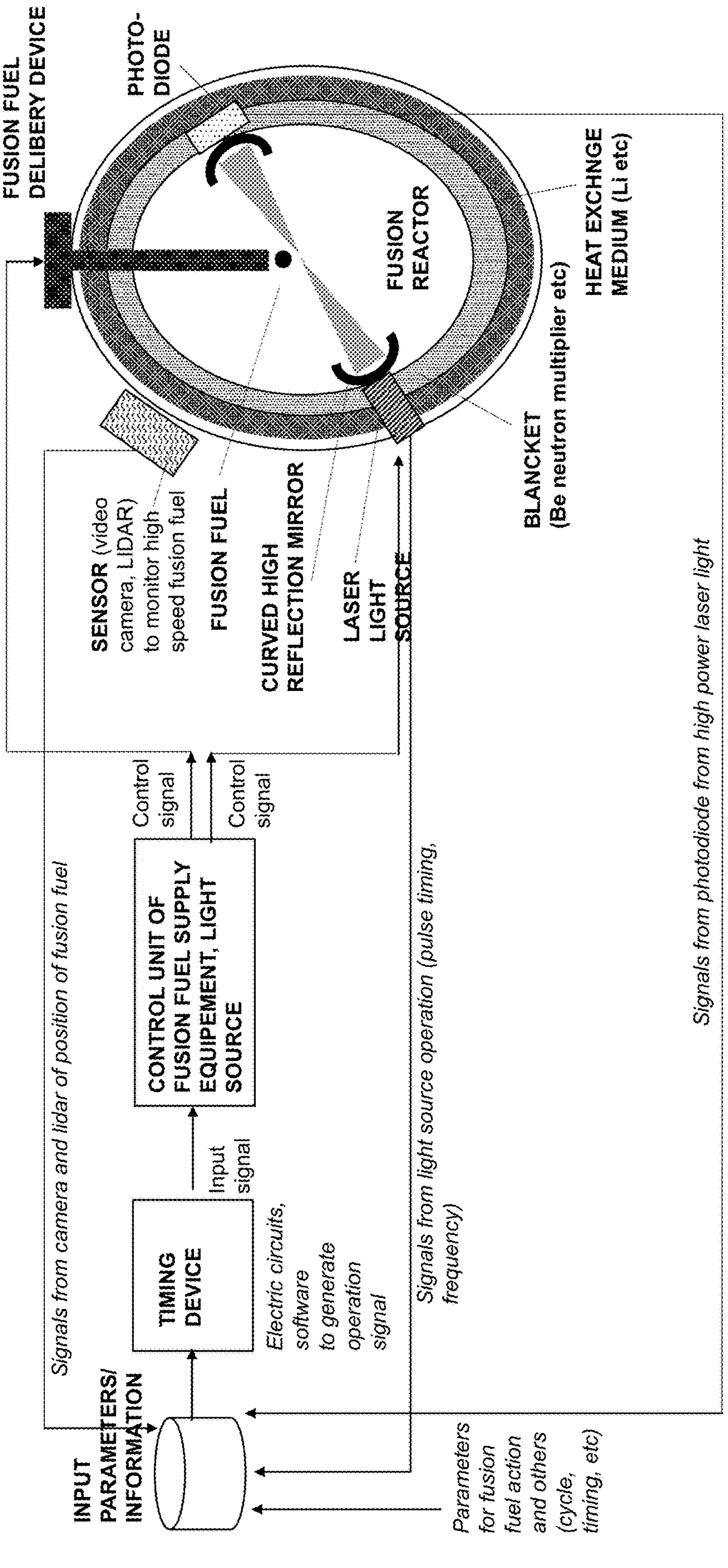
FIG. 11 is a more detailed diagram of a fusion reactor according to an example of the present invention.

FIG. 11 is a more detailed diagram of a fusion system according to an example of the present invention. As shown, the system includes various elements including a processing platform for input parameters and information, a timing device, a driver device, and a fusion system. The fusion system has an inner reactor region configured concentrically with an outer heat exchange region. The reactor also has a plurality of laser devices, each of which is configured to a pair of mirror devices to form a cavity region. The plurality of laser devices are disposed spatially around a periphery of a reaction region. The system has a fuel target supply device, such as a hohlraum or pellet supply device. The system has a light detection and ranging (LIDAR) system and video camera system to image and track a location of a fusion pellet or a hohlraum.

As shown, information and/or feedback from the laser light source are fed into the processing platform for input parameters and information. The processing platform can be a suitable computer-based processor, controller, or other type of processer. Examples of feedback can include signals from the light source and the photodiodes to detect the transmitted light from the backside of each mirror, including pulse timing, frequency, power outputs, and other parameters. Parameters for cycling laser devices are also fed into the processing platform. The processing platform further includes storage, such as volatile and non-volatile memory, including dynamic random-access memory, flash memory, static rand-access memory, fixed memory devices, hard drives, and any combination of electronic and/or optical memory devices. The information from the processing platform is fed into the timing device. The timing device can include circuits and software to generator operation signals to the driver device (see FIG. 12). The timing device is configured with a clock signal, which is configured with the information, to generate an electronic signal or signals for the driver device, shown in FIG. 11 as a control unit. The driver device is configured with the operation signals to generate an electrical output or outputs to send control signals to the various elements of the reactor. The elements include the fuel pellet or hohlraum supply device and the laser light sources. Further details of the present system can be found throughout the present specification and more particularly below.

Figure 12:
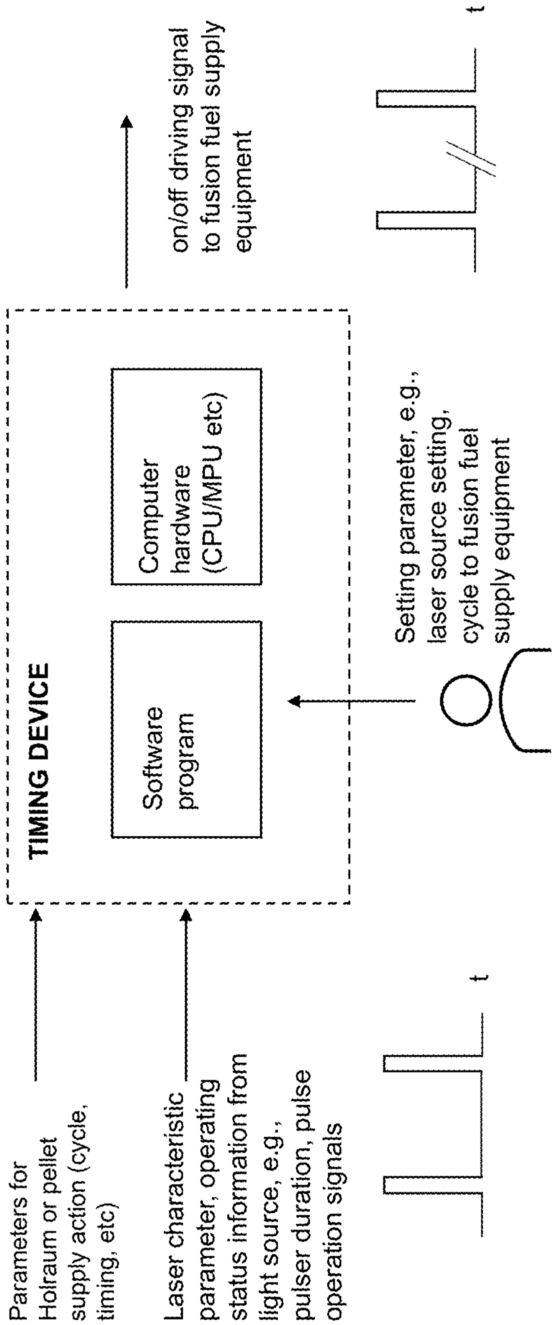
FIG. 12 is a detailed diagram of a timing device for a fusion system in an example of the present invention.

FIG. 12 is a detailed diagram of a timing device for a fusion system in an example of the present invention. As shown, the timing device receives inputs of, for example, laser characteristics, such as operating status, pulse duration, pulse operation, frequency, and other information. The timing device can also receive input parameters for hohlraum or pellet supply action (e.g., cycle, timing, etc.). The timing device includes a software program, which is programmable (e.g., with setting parameters such as a laser source setting, cycle to fusion fuel supply equipment, etc.), and computer hardware (e.g., CPU, MPU, etc.), among other elements. The timing device outputs an on/off signal from the driver device to the fuel pellet supply or other system components.

In an example, the driver device includes a computer for controlling a drive, which is a high-speed driver, also known as a "drive computer". The drive computer is a specialized device that is used to control and monitor the operation of the high-speed driver, such as an actuator of the high-speed driver. In an example, the drive computer typically includes a microprocessor or microcontroller, which is a type of central processing unit (CPU) that is responsible for controlling the operation of the drive. The drive computer also includes input/output (I/O) interfaces, which allow it to receive input signals from sensors or other devices and to output control signals to the drive. In an example, the drive computer may also include memory for storing data and instructions, as well as various other hardware and software components that enable it to perform its functions. Some drive computers may also include additional features, such as communication interfaces for communicating with other devices or systems, or built-in diagnostic tools for monitoring and troubleshooting the drive. Further details of the present system and method are described below.

In the example, all of laser light sources are synchronized for high power pulsed lasers to hit the fuel pellet or the hohlraum in the center of the reactor. The position of the pellet or the hohlraum is monitored by LIDAR and a video camera, and feedback is provided to the computer to synchronize all of the laser light sources, including signals from photodiodes located at backsides of the mirrors opposite the laser light sources, and the fuel pellet or the hohlraum supply speed and supply repetition rate.

Figure 13:
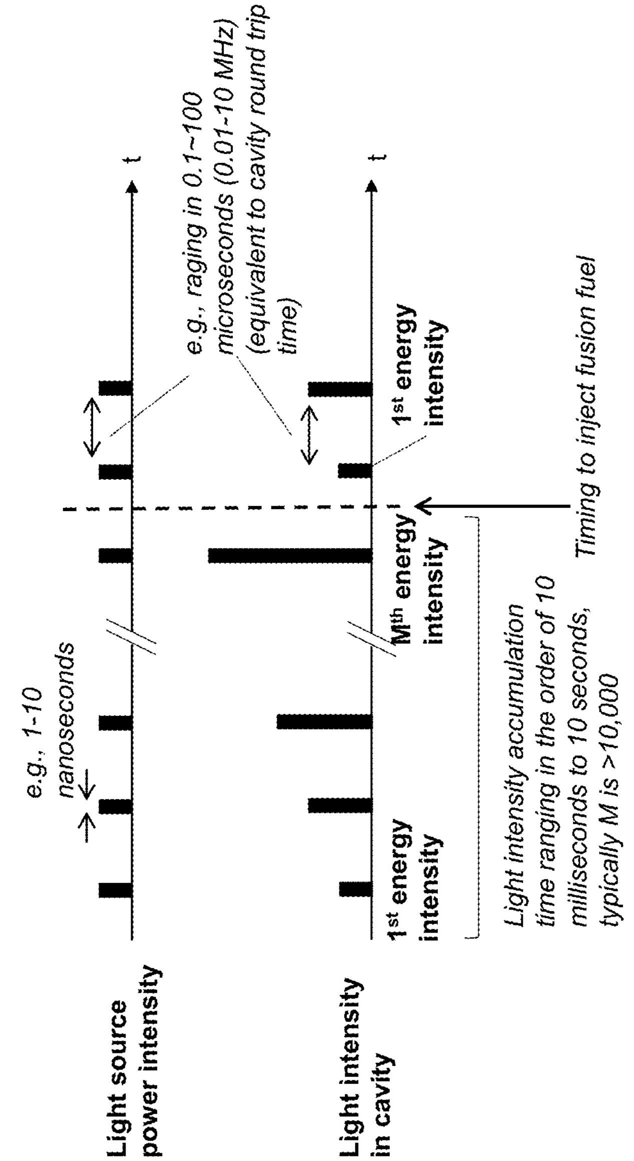
FIG. 13 is a timing diagram for generating a high intensity pulse laser in an example of the present invention.

FIG. 13 is a timing diagram for generating a high intensity pulse laser in an example of the present invention. As shown in the first line labelled "Light source power intensity," each laser pulse from the light source has a pulse in a nanosecond range, e.g., 1-10 nanoseconds. A frequency for the pulse can range from 0.1 to 100 microseconds (0.01 to 10 MHz), for example. Light intensity in a cavity increases in intensity with each pulse from the source from a first energy intensity, a second energy intensity, to an Mth energy intensity, where M is 1,000 or greater, but can be fewer or more depending upon the application. Once the Mth energy is achieved from each of the laser cavity regions, the present method and system injects a pellet or a hohlraum into a center of each cavity or reactor to initiate a fusion reaction.

In an example, the present high intensity pulse laser system can be configured with a laser fusion system for generating energy. As an example, laser fusion is a process that uses lasers to initiate and sustain a nuclear fusion reaction, which is a process that releases energy by combining atomic nuclei. This process has the potential to provide a virtually limitless and clean source of energy.

In laser fusion, a beam of high-energy lasers is used to create a plasma, which is a hot, ionized gas that is composed of free electrons and atomic nuclei. The plasma is then compressed and heated to extremely high temperatures and pressures, causing the atomic nuclei to fuse together and release energy. An example of laser fusion is inertial confinement fusion (ICF). In ICF, a laser beam is used to create a shock wave that compresses a small pellet of fusion fuel. Further details of laser fusion are described in more detail below.

In an example, the present invention provides a laser fusion system. The system has a reactor housing, which includes an interior region maintained in a vacuum environment. The reactor housing creates a vacuum chamber. The system has a reaction region within a vicinity of a spatially center region of the reactor housing and a peripheral region formed within an interior of the reactor housing, the peripheral region surrounding the reactor region. In an example, outside the reactor housing, connect inside, the system forms radial protrusions while maintaining a vacuum, and create a reflecting mirror inside beyond that, as shown.

In an example, the system has a plurality of cavity regions numbered from 1 through N within the interior region of the reactor housing and spatially configured around the peripheral region such that each of the plurality of cavity regions extends from a first side of the peripheral region to a second side of the peripheral region. Preferably, the first side is opposing the second side along a straight line, and forms a linear path along a diameter of the interior region. In an example, the plurality of cavity regions forms a hub and spoke configuration. Each cavity region has a center region concentric with the reactor region and each cavity region has a first end coupled to the first side and a second end coupled to the second side of the peripheral region. In an example, N is greater than 10 and can be 100, 200, or thousands, although there may be fewer cavities in other examples.

In an example, a pair of mirrors are configured, respectively, on the first end and the second end of the cavity regions. In an example, a laser light source configured to emit electromagnetic radiation coupled to at least one of the pair of mirror devices such that a laser beam propagating from the laser light source between the pair of mirror devices increases in energy intensity from a first intensity to a second intensity to an $M^{th}$ intensity for M cycles of the laser beam propagating between the pair of mirror devices, where M is greater than 1,000 cycles, although there may be fewer or more.

In an example, N is 10 to 200; and M is 1,000 and greater.

In an example, the system has a fuel pellet or a container comprising the fuel pellet inside disposed within the reactor region and is coupled to the plurality of cavity regions as each of the plurality of cavity regions spatially intersect within the reactor region to provide an energy level sufficient to ignite the fuel pellet directly or indirectly (through the Xray radiation inside of hohlraum as mentioned previously) for a fusion reaction.

In an example, the system also has a photo diode detector device coupled to at least one of the mirrors for each pair of mirrors and configured opposite of the laser device.

In an example, each pair of mirrors is a curved or deformable mirror device. In an example, each of the mirrors is a high reflection curved mirror with a reflectivity of more than 99.99%, which is focused into the reaction region of laser fusion system. In an example, each of the mirrors is placed inside of the reactor housing and maintained in the vacuum environment. The most preferred location of the mirrors is configured outside the reactor housing, connect inside, create radial protrusions while maintaining a vacuum, and create a reflecting mirror inside beyond that, as shown.

In an example, each of the cavity regions is a Fabry Perot resonator. In an example, the laser light source is configured to output electromagnetic radiation with a power of 0.01 Joule and greater.

In an example, the tube opening region is a vacuum region coupled to a fuel pellet (or the hohlraum) delivery device. At first, pellet (or the hohlraum) is placed inside of the fuel pellet (or the hohlraum) delivery device at an atmospheric pressure because the device is located outside of reactor. By opening the gate or valve in the tube, the fuel pellet (or the hohlraum) is sucked into the tube due to the pressure difference from atmospheric pressure to vacuum. Then, the fuel pellet (or the hohlraum) is injected into the reaction region from the opening of the tube with a high speed into the reaction region.

In an example, the container is a hohlraum. In an example, the container is a hohlraum; and wherein the laser beam is irradiated to an inside surface of the hohlraum to generate X-rays that interact with the fuel pellet. In an example, the container is a hohlraum; and wherein the laser beam is irradiated to an inside surface of the hohlraum to generate Xrays that irradiate the fuel pellet to generate a reaction of nuclear fusion.

In an example, the system has a blanket structure configured to the reactor housing and adapted to absorb a fusion energy from the reactor housing to change the fusion energy to thermal energy, the blanket structure is coupled to a heat exchange medium which is configured to transfer thermal energy from the blanket structure to the heat exchange medium. In an example, the heat exchange medium transfers the thermal energy from the heat exchange medium to water to generate a high-pressure steam adapted to rotate a turbine, the turbine coupled to an electric generate to create electrical energy. The blanket structure and heat exchange medium are placed at a region of the reactor housing having a smaller diameter to absorb the fusion energy effectively in comparison with a diameter of the reactor housing at the peripheral region where mirrors are placed in an example.

In an example, the system has a fuel pellet or hohlraum delivery device coupled to the reactor housing, a timing device coupled to the fuel pellet or hohlraum delivery device; and a driver device coupled between the timing device and the fuel pellet delivery device. In an example, the fuel pellet or hohlraum is delivered by a tube within a vicinity of the reaction region of laser fusion system. In an example, the tube has an opening that is less than 0.01 mm or 20 mm from the reaction region. The fuel pellet or hohlraum is characterized by a speed of 0.5 km/see to 100 km/see at the reaction region in an example. The fuel pellet or hohlraum is supplied by a repetition rate of 1 Hz to 50 Hz at the reaction region in an example, the fuel pellet or hohlraum is accelerated to a high speed by using the pressure difference between the fuel pellet or hohlraum delivery device region and the opening region of the tube in an example, or gunpowder, or other energy or accelerating devices.

In an example, the cavity region defined by a spatial length between each pair of mirrors is larger than a diameter of the reactor housing; and further comprising a blanket structure and a heat exchange medium configured on an outer or inner wall of the smaller diameter reactor housing to reduce any damage to any of the mirror devices from a radiation generated by the fusion reaction at the reaction region in the laser fusion system.

In an example, the present invention provides a laser fusion system. The system has a reactor housing having an interior region maintained in a vacuum environment. The system has a plurality of aperture regions spatially disposed along a periphery of the reactor housing. In an example, each of the aperture regions having an aperture size of A. In an example, the system has a reaction region within a vicinity of a spatially center region of the reactor housing. The reaction region characterized by a reactor length extending along a major cross-section of the reactor region.

In an example, a plurality of cavity regions numbered from 1 through N in communication with the reaction region such that each of the plurality of cavity regions are spatially disposed through the reaction region. Each of the plurality of cavities is configured through a pair of aperture regions opposing each other, and extends outside of the reaction region such that the plurality of cavity regions forms a hub and spoke configuration and are characterized by an intersection region within the spatially center region of the reaction region. In an example, N is greater than 10, but can be larger or smaller.

In an example, a pair of mirrors are configured, respectively, on the first end and the second end of each of the cavity regions, each of the mirrors having a mirror size of W.

In an example, a laser light source is configured to emit electromagnetic radiation coupled to at least one of the pair of mirror devices such that a laser beam propagating from the laser light source between the pair of mirror devices increases in energy intensity from a first intensity to a second intensity to an Mth intensity for M cycles of the laser beam propagating between the pair of mirror devices, where M is greater than 1,000 cycles.

In an example, a fuel pellet or a container comprises the fuel pellet inside disposed within the reactor region and is coupled to the plurality of cavity regions as each of the plurality of cavity regions spatially intersect within the reactor region to provide an energy level sufficient to ignite the fuel pellet for a fusion reaction.

In an example, a ratio of W/A of at least 2 up to 500 is configured to reduce any damage to one or more of mirror devices by reducing the aperture size to a predetermined dimension to prevent the radiation of the fusion reaction generated at a center of reaction region to interact with the mirror device through any one of the cavity regions.

In an example, the aperture size A is a diameter, width, height, or major dimension of the aperture; and wherein the mirror size W is a diameter, width, height, or major dimension of the mirror.

In an example, the present invention provides a laser fusion system. The system has a reactor housing having an interior region maintained in a vacuum environment. In an example, the system has at least a pair of aperture regions spatially disposed along a periphery of the reactor housing, each of the aperture regions having an aperture size of A and a reaction region within a vicinity of a spatially center region of the reactor housing. In an example, the reaction region is characterized by a reactor length extending along a major cross-section of the reactor region. In an example, at least one cavity region in communication with the reaction region such that the optical cavity region is spatially disposed through the reaction region, configured through the pair of aperture regions opposing each other, and extending outside of the reaction region. In an example, a pair of mirrors is configured, respectively, on the first end and the second end of the cavity regions, each of the mirrors having a mirror size of W. A laser light source configured to emit electromagnetic radiation coupled to one of the pair of mirror devices such that a laser beam propagating from the laser light source between the pair of mirror devices within the cavity region increases in energy intensity from a first intensity to a second intensity to an Mth intensity for M cycles of the laser beam propagating between the pair of mirror devices, where M is greater than 1,000 cycles. In an example, the system has a fuel pellet or a container comprising the fuel pellet inside disposed within the reactor region and coupled to the cavity region to provide an energy level sufficient to ignite the fuel pellet for a fusion reaction and a ratio of W/A of at least 2 up to 500 configured to reduce any damage to one of mirror devices by reducing the aperture size to a predetermined dimension to prevent the radiation of the fusion reaction generated at a center of reaction region to interact with the mirror device through the cavity region.

While the above is a full description of the specific examples, various modifications, alternative constructions and equivalents may be used. As an example, the packaged device can include any combination of elements described above, as well as outside of the present specification. In an example, the high intensity laser forms a resonator between the pair of mirror devices using constructive interference of each of the laser beams. In an example, the first path with the high intensity pulse laser is provided in a resonator device. In an example, the present invention provides a system and method to generate aa concentric or spherical resonator within a reaction region to focus laser light at a center of the reactor. Therefore, the above description and illustrations should not be taken as limiting the scope of the present invention which is defined by the appended claims.

The invention claimed is:

1. A laser fusion system, the system comprising:

a reactor housing, the reactor housing having a diameter and defining an interior region maintained in a vacuum environment;

wherein the interior region comprises a reaction region at a center of the reactor housing and a peripheral region surrounding the reaction region;

a fuel target disposed in the reaction region at the center of the reactor housing;

a plurality of mirrors positioned on an interior surface of the reactor housing, the plurality of mirrors arranged in N pairs, where N is greater than or equal to 10, each pair of mirrors comprising a first mirror and a second mirror diametrically opposed to the first mirror, wherein each pair of mirrors defines a Fabry Perot resonant cavity that extends linearly from the first mirror to the second mirror along the diameter of the reactor housing and intersects with the center of the reactor housing;

N laser light sources, each source coupled to the first mirror of each pair of mirrors and configured to emit a laser beam to the first mirror such that the laser beam propagates in the respective Fabry Perot resonant cavity between each respective pair of mirrors and increases in intensity from a first intensity to a second intensity for M cycles, where M is greater than or equal to 1000; and wherein each laser beam in each Fabry Perot resonant cavity intersects within the fuel target to cause nuclear fusion.

2. The system of claim 1 wherein each pair of mirrors includes a photo diode detector coupled to the second mirror.

3. The system of claim 1 wherein each of the plurality of mirrors is a curved or deformable mirror.

4. The system of claim 1 wherein N is less than or equal to 200.

5. The system of claim 1 wherein each of the N laser light sources is configured to output the laser beam with a pulse energy power of 0.01 Joule and greater or a continuous wave (CW) power of 10 kW and greater.

6. The system of claim 1 further comprising a fuel target delivery device configured on an exterior region of the reactor housing, wherein the fuel target delivery device is coupled to a tube within the interior region of the reactor housing, wherein the tube includes a tube opening region that has a pressure lower than atmospheric pressure; and wherein the fuel target delivery device is configured to transfer the fuel target through the tube opening region to the reaction region.

7. The system of claim 1 wherein the fuel target comprises a fuel pellet configured within is a hohlraum.

8. The system of claim 1 wherein the fuel target comprises a fuel pellet configured within a hohlraum; and wherein the laser beam from each laser light source is irradiated to an inside surface of the hohlraum to generate X-rays that interact with the fuel pellet.

9. The system of claim 1 wherein the fuel target comprises a fuel pellet configured within a hohlraum; and wherein the laser beam from each laser light source is irradiated to an inside surface of the hohlraum to generate X-rays that irradiate the fuel pellet to generate a reaction of nuclear fusion.

10. The system of claim 1 further comprising a fuel target delivery device coupled to the reactor housing, wherein the fuel target delivery device is coupled to a tube within the interior region of the reactor housing and configured to deliver the fuel target to the reaction region, and wherein the fuel target includes a fuel pellet or a hohlraum with a fuel pellet disposed within;

a timing device coupled to the fuel target delivery device and configured to generate operation signals; and a driver device coupled between the timing device and the fuel target delivery device and configured to receive the operation signals and generate control signals for the fuel target delivery device.

11. The system of claim 1 further comprising a fuel target delivery device configured on an exterior region of the reactor housing, wherein the fuel target delivery device is coupled to a tube within the interior region of the reactor housing and configured to deliver the fuel target to the reaction region.

12. The system of claim 11 wherein the tube has an opening that is less than 1 meters or 0.5 meters from the reaction region.

13. The system of claim 12 wherein the fuel target delivery device is configured to deliver the fuel target via the tube at a speed of 0.5 km/sec to 50 km/sec at the reaction region.

14. The system of claim 12 wherein the fuel target delivery device is configured to accelerate the fuel target to a speed greater than 0.5 km/sec by using a pressure difference between a tube opening region of the tube and an inside region of the fuel target delivery device.

15. The system of claim 11 wherein the fuel target delivery device is configured to deliver the fuel target via the tube at a repetition rate of 1 Hz to 30 Hz to the reaction region.

16. The system of claim 1 wherein each of the mirrors is a curved mirror with a reflectivity of more than 99.99%.

* * * * *